United States Patent [19]
Cooper et al.

[11] Patent Number: 5,961,588
[45] Date of Patent: Oct. 5, 1999

[54] HANDLING OF COMMANDS PASSED BETWEEN THE SERVER AND CLIENT STATIONS OF A TELECOMMUNICATIONS SYSTEM

[75] Inventors: Guy A. Cooper, Windsor; Jonathan F. Nethercott, Guildford; Jonathan A. Thompson, Newbury, all of United Kingdom

[73] Assignee: Alcatel USA Sourcing, L.P., Plano, Tex.

[21] Appl. No.: 08/813,784

[22] Filed: Feb. 21, 1997

[30] Foreign Application Priority Data

Feb. 22, 1996 [GB] United Kingdom ............... 9603728
Sep. 13, 1996 [GB] United Kingdom ............... 9619226

[51] Int. Cl.$^6$ ..................... G06F 15/16; G06F 15/173
[52] U.S. Cl. .................. 709/203; 709/223; 709/244; 707/103
[58] Field of Search .................. 707/500, 9, 103, 707/100; 395/200.32, 677; 370/467; 709/203, 223, 244

[56] References Cited

U.S. PATENT DOCUMENTS

| | | | |
|---|---|---|---|
| 4,633,430 | 12/1986 | Cooper | 707/500 |
| 5,347,632 | 9/1994 | Filepp et al. | 395/200.32 |
| 5,421,012 | 5/1995 | Khoyi et al. | 395/677 |
| 5,583,563 | 12/1996 | Wanderscheid | 709/203 |
| 5,649,185 | 7/1997 | Antognini et al. | 707/9 |
| 5,727,203 | 3/1998 | Hapner et al. | 707/103 |
| 5,737,595 | 4/1998 | Cohen et al. | 707/100 |
| 5,745,681 | 4/1998 | Levine et al. | 709/200 |
| 5,794,038 | 8/1998 | Stutz | 709/203 |
| 5,809,028 | 9/1998 | Nethercott et al. | 370/467 |
| 5,848,246 | 12/1998 | Gish | 709/203 |

FOREIGN PATENT DOCUMENTS

| | | | |
|---|---|---|---|
| 9517060 | 6/1995 | WIPO | H04L 12/24 |
| 9535000 | 12/1995 | WIPO | H04Q 3/545 |

*Primary Examiner*—Krisna Lim
*Attorney, Agent, or Firm*—Baker & Botts, L.L.P.

[57] ABSTRACT

The present invention provides a client station and method for controlling a telecommunications system, the telecommunications system including a central station and a server station. The server station is arranged to maintain an object model thereon representing the central station, and is connectable to the central station to send control signals to the central station in accordance with the object model. The client station comprises a communications manager for establishing first and second interfaces with the server station to enable communication between the client station and the server station, thereby to manage the object model maintained on the server. The client station has a memory for storing a portion of the object model, and a processor for processing commands received by the client station via the first interface from a queue maintained on the server station. Further, there is provided a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor.

18 Claims, 13 Drawing Sheets

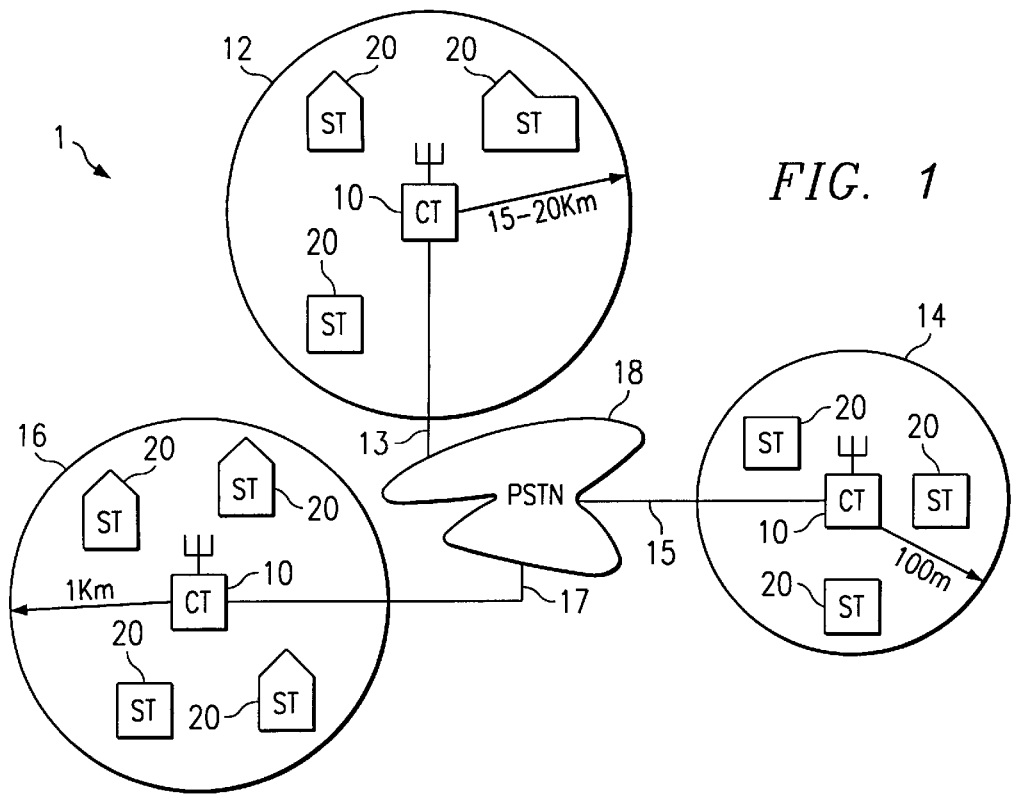
FIG. 1
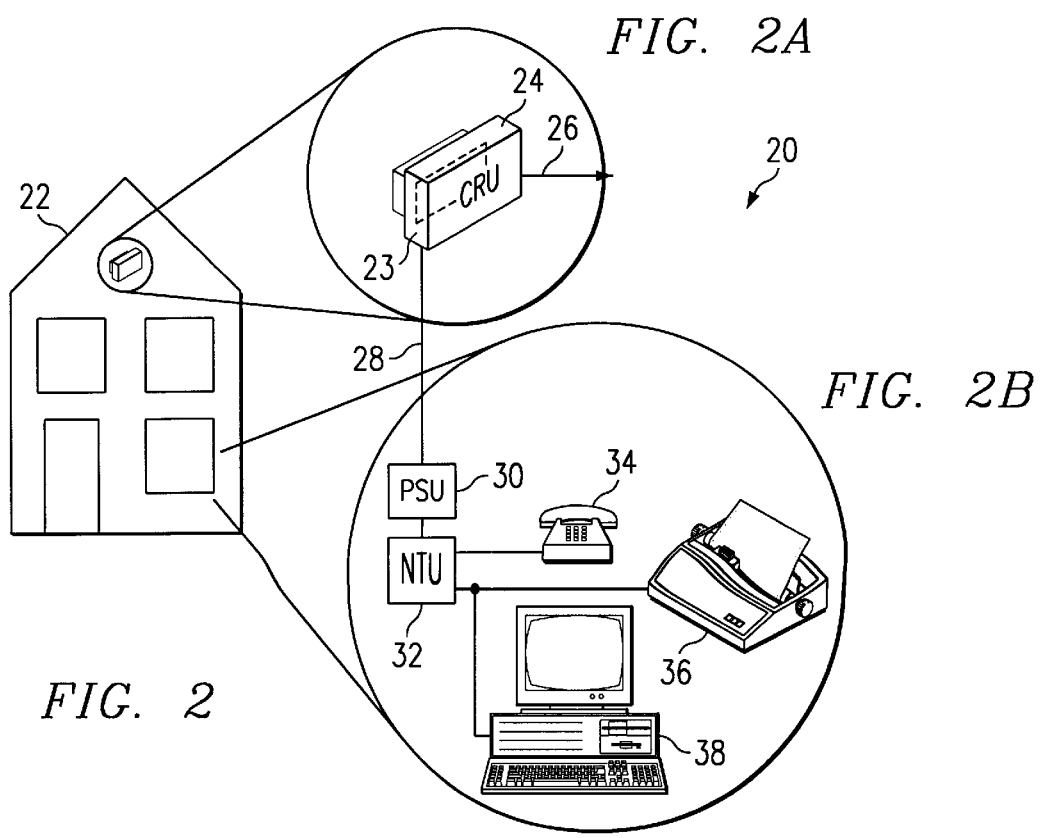
FIG. 2A
FIG. 2B
FIG. 2

HANDLING OF COMMANDS PASSED BETWEEN THE SERVER AND CLIENT STATIONS OF A TELECOMMUNICATIONS SYSTEM

TECHNICAL FIELD OF THE INVENTION

This invention relates to control systems for telecommunications systems and, in particular, to the handling of commands passed between server and client stations forming the control system. The invention has particular implementation in the area of wireless telecommunications systems, but its use is not restricted to wireless systems.

BACKGROUND OF THE INVENTION

A telecommunications system will typically include one or more control stations (which will be referred to hereafter as central stations or central terminals) at which equipment is contained for managing the telecommunications network. In a wired telecommunications system, this equipment may be at one or more of the telephone exchange sites in the telecommunications system. In a wireless telecommunications system, a central station may be included that is connected to the public telephone network and exists to relay messages from subscribers in the cell controlled by the central station to the public telephone network, and vice versa. Typically, a site controller, or server, is connectable to the central station for controlling the central station. However, this arrangement has generally required an operator to be physically present at the site controller in order to manage the central terminal. UK Patent application 9603782.5, filed Feb. 22, 1996, alleviates this problem by providing a server that is local to the central station and has an object model maintained thereon identifying the structure of the central station, and then enabling a number of client stations, either local or remote, to connect to the local server in order to invoke operations to alter the object model on that server. Such alterations are then passed by the local server on to the central station to cause corresponding changes in the central station.

However, in such an arrangement as described in UK Patent application 9603782.5, the client station is required to contain a complete copy of the object model maintained in the server. This complete copy of the object model would typically be made at the time that the client station first connects to the server. However as telecommunications systems become more complex, so the object model maintained on the server becomes more complex, and the time taken to make a complete copy of that object model on the client station becomes progressively longer. Hence there is a significant initial performance degradation associated with establishing the copy of the object model on the client station. Further, it is possible that the client station will be used to manage the object models on a number of server stations. Hence, if a complete copy of each object model is to be stored at the client station, then a large amount of memory is required at the client station.

To alleviate this problem, it is proposed that only a portion of the object model maintained on the server station be copied to the client station when the client station initially connects to the server. This alleviates the initial performance problem resulting from loading the entire object model from the server, and also reduces the memory requirements of the client station. However, it will be apparent to those skilled in the art that this approach does raise some additional issues. The portion of the object model loaded on the client station may not always provide the required level of detail about the telecommunications system to enable the user of the client station to effectively manage the telecommunications system. Additionally, since the former client-server arrangement described in UK patent application no 9603782.5, filed Feb. 22, 1996, operates on the principle that the client will always have a complete copy of the object model on the server, the client station will receive commands from the server reflecting updates made to various objects of the object model. The portion of the object model may not contain the objects in question, and so the client station may be unable to alter its copy of the model to reflect these changes.

SUMMARY OF THE INVENTION

Viewed from a first aspect the present invention provides a client station for controlling a telecommunications system, the telecommunications system including a central station and a server station, the server station being arranged to maintain an object model thereon representing the central station, and being connectable to the central station to send control signals to the central station in accordance with the object model, the client station comprising: a communications manager for establishing first and second interfaces with the server station to enable communication between the client station and the server station, thereby to manage the object model maintained on the server; a memory for storing a portion of the object model; a processor for processing commands received by the client station via the first interface from a queue maintained on the server station; a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor. In preferred embodiments, the commands received from the queue on the server station relate to updates made to objects of the object model maintained on the server station. The retrieval means may be embodied in any suitable manner. In preferred embodiments, the communications manager is used to establish with the server station a suitable interface for retrieving additional objects of the object model, and the retrieval means is then embodied by a retrieve command which can be invoked to cause the objects to be retrieved via the interface.

The present invention provides the client station with a suitable mechanism for handling commands from the server station, and, when necessary, for retrieving additional parts of the object model from the server for inclusion in the portion of the object model stored at the client station. The arrangement of the present invention enables the processing of commands to be controlled such that, if an additional object needs to be retrieved by the client station before a particular command can be processed, the processing of commands can be temporarily halted whilst the additional object is retrieved and the portion of the object model updated. This ensures that commands are correctly applied to the portion of the object model stored in the server station.

It should be noted that whilst the client station and server station are logically distinct from each other, they may both physically reside on the same machine. The invention is applicable both to situations where the client station is on the same machine as the server, and to situations where the client station resides on a different machine to that on which the server resides.

The commands may take any appropriate form. However, in preferred embodiments, the commands to be executed on the portion of the object model in said memory comprise operations including a path identifier identifying a destination object to which the operation should be applied.

Preferably, each object in the portion of the object model has status information associated therewith, and the processor, on processing a command, is arranged to determine whether any of said status information needs updating, and to update that status information. In preferred embodiments, the client station further comprises: a display controller for displaying on a display device connectable to the client station a view of the objects stored in said memory, a visual representation of said status information being displayable with each object view; the processor, on updating said status information, being arranged to cause any displayed visual representation of status information to be updated. Hence, the user is provided with a visual indication of changes within the object model.

The telecommunications system may comprise a plurality of server stations and central stations, each server station being connectable to at least one central station and maintaining an object model representing said at least one central station, and the client station being connectable to a number of said plurality of server stations. Hence, the client station can connect to one or more server stations, each server station being arranged to manage one or more central stations, and so the client station can be used to manage a large amount of telecommunications equipment, the equipment possibly being dispersed over a wide geographical area.

Preferably, the first and second interfaces are established via a dynamic interface comprising means for generating a remote procedure call interface object to reconfigure the dynamic interface to enable operations on the server station to be invoked from the client station.

If an object in the portion of the object model has a child object associated therewith, but the child object is not stored in the portion of the object model, then in preferred embodiments a marker is associated with the object to indicate the existence of said child object. If, during the routing of a command to its destination object, a marker is reached, then preferably the routing operation can be caused to invoke the retrieval of the child object identified by the marker.

If an object is deleted from the object model, a null identifier is preferably added to the object model to indicate that the object has been deleted. This is preferable, since it avoids any need to alter path identifiers for any of the objects in the object model, and hence subsequent requests to retrieve particular objects can be accurately processed.

In preferred embodiments, the client station further comprises: a recording means for maintaining a record, for each object in the portion of the object model stored in the memory, identifying a time at which the most recent command was applied to that object by the client station; and a memory reclaim means for periodically referencing the record and for deleting an object from the memory of the client station after a predetermined time has passed since the most recent command was applied to that object, any object deleted from the memory being replaced by a marker. The recording means and memory reclaim means may be embodied by any suitable hardware or software. In preferred embodiments, they are embodied as software routines stored in the memory of the client station and executed by the processor which interfaces with suitable read/write hardware to store the record and to delete objects from memory as required. This 'cleanup' arrangement enables the memory requirements of the client station to be reduced since any unused objects are deleted from the memory, thereby freeing up space for the storage of other objects As mentioned earlier, the invention is applicable to both wired and wireless telecommunications systems but, in preferred embodiments, the telecommunications system is a wireless telecommunications system, in which the central terminal is arranged to relay messages from subscriber terminals to a public telephone network, the connection between the subscriber terminals and the central terminal being wireless connections.

Viewed from a second aspect, the present invention provides a communications manager for a client station arranged to control a telecommunications system, the telecommunications system including a central station and a server station, the server station being arranged to maintain an object model thereon representing the central station, and being connectable to the central station to send control signals to the central station in accordance with the object model, the client station storing a portion of the object model in memory, the communications manager comprising: means for establishing first and second interfaces with the server station to enable communication between the client station and the server station via an interface, thereby to manage the object model maintained on the server; a command manager for receiving commands via the first interface from a queue maintained on the server station, the client station having a processor arranged to process the commands received via the first interface; a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor.

Viewed from a third aspect, the present invention provides a method of controlling a telecommunications system from a client station, the telecommunications system including a central station and a server station, the server station being arranged to maintain an object model thereon representing the central station, and being connectable to the central station to send control signals to the central station in accordance with the object model, the method comprising the steps of: employing a communications manager in the client station to establish first and second interfaces with the server station to enable communication between the client station and the server station, thereby to manage the object model maintained on the server; storing in a memory of the client station a portion of the object model; processing commands received by the client station via the first interface from a queue maintained on the server station; responsive to a command requiring an operation to be performed on an object not currently in the portion of the object model stored in the memory, retrieving from the server station via the second interface said object for inclusion in the portion of the object model stored in the memory, during which time no further commands are processed by the processor.

Viewed from a fourth aspect, the present invention provides a computer program product on a computer readable memory for operating a client station to control a telecommunications system, the telecommunication system including a central station and a server station, the server station being arranged to maintain an object model thereon representing the central station, and being connectable to the central station to send control signals to the central station in accordance with the object model, the computer program product comprising: means for controlling a communications manager to establish first and second interfaces with the server station to enable communication between the client station and the server station, thereby to manage the object model maintained on the server; means for storing a portion of the object model in a memory of the client station; means for causing a processor to process commands received by the client station via the first interface from a queue maintained on the server station; a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor.

The present invention hence provides the client station with a suitable mechanism for handling such commands from the server station, and, when necessary, for retrieving additional parts of the object model from the server for inclusion in the portion of the object model stored at the client station. By this approach, commands can be processed by the client station by reading them from the queue, and the processing of commands can be stalled during periods when additional objects are being loaded from the server station, thereby ensuring that commands are correctly applied to the portion of the object model stored in the server station.

BRIEF DESCRIPTION OF THE DRAWINGS

Embodiments of the invention will now be described, by way of example only, with reference to the accompanying drawings in which like reference signs are used for like features and in which:

FIG. 1 is a schematic overview of an example of a wireless telecommunications system;

FIG. 2 is a schematic representation of a customer premises;

FIGS. 2A and 2B are schematic illustrations of an example of a subscriber terminal of the telecommunications system of FIG. 1;

DETAILED DESCRIPTION OF THE INVENTION

Figure 3:
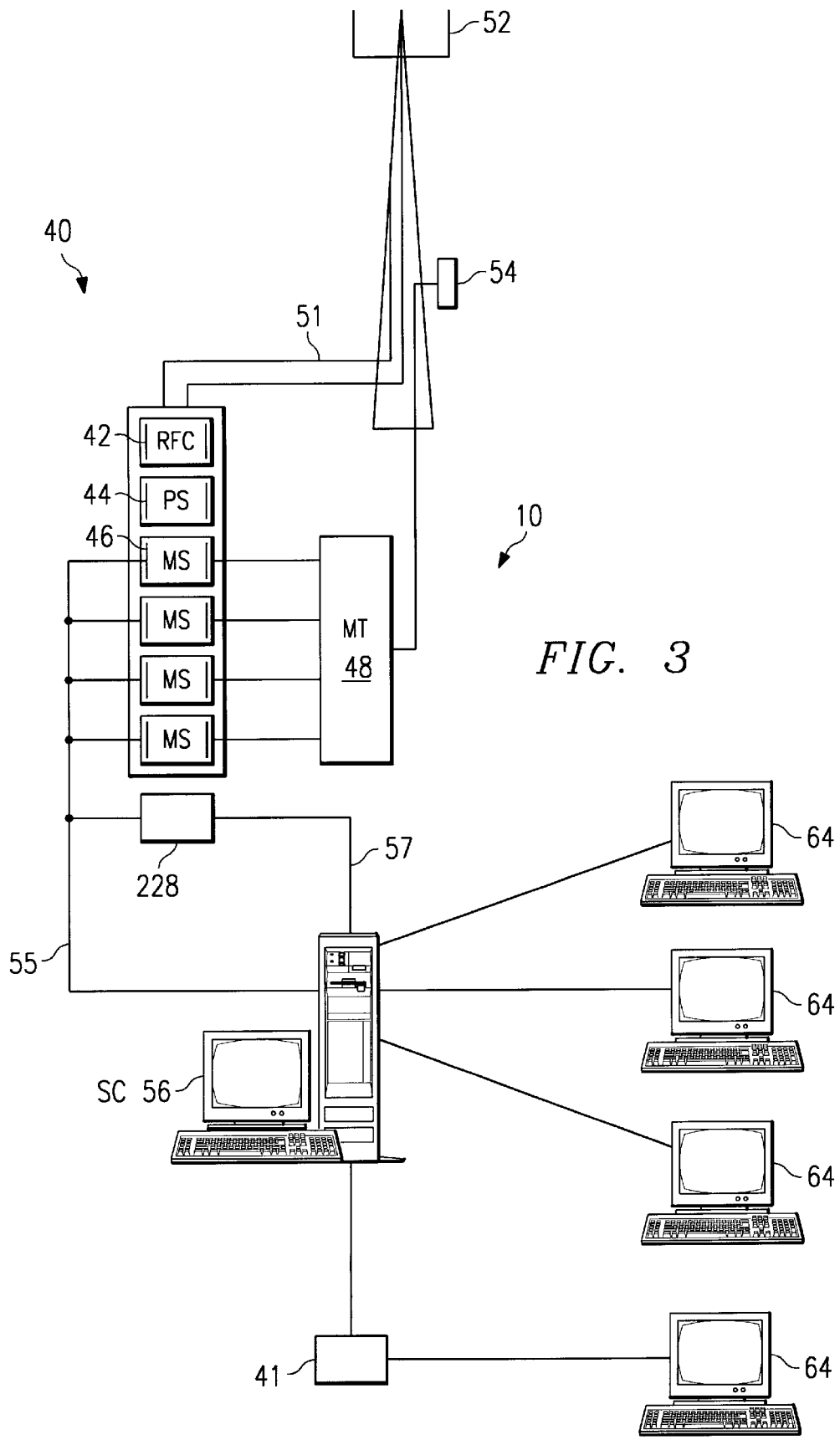
FIG. 3 is a schematic illustration of an example of a central terminal of the telecommunications system of FIG. 1.

In the preferred embodiments of the present invention, a wireless telecommunications system will be discussed in which a central station is connected to the public telephone network and exists to relay messages from subscribers in the cell controlled by the central station to the public telephone network, and vice versa.

FIG. 1 is a schematic overview of an example of such a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

FIGS. 2A and 2B illustrate an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four ways so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

The central terminal 10 is connected to and controlled by a site controller (SC) 56 which is a powerful computer, preferably a server. The server 56 can be connected to each modem shelf of the central terminal 10 via, for example, RS232 connections 55. The server 56 provides functions such as the localization of faults, alarms and status and the configuring of the central terminal 10. A server 56 will typically support a single central terminal 10, although a plurality of servers 56 could be networked for supporting a plurality of central terminals 10, and indeed one server may support a plurality of central terminals. The server 56 is typically connectable to a plurality of remote client and remote server stations 64. The connection may be an ethernet link, a PSTN link via a modem 41 or other wireless link.

As an alternative to the RS232 connections 55, which extend to the server 56, data connections such as an X.25 link 57 could instead be provided from a pad 228 to the server 56.

Figure 3A:
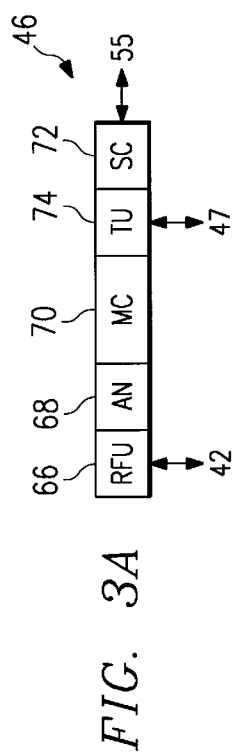
FIG. 3A is a schematic illustration of a modem shelf of a central terminal of the telecommunications system of FIG. 1.

As will be later described, the server 56 maintains an object based control structure (hereafter referred to as an object model) for enabling the control of the wireless telecommunications system. Furthermore, and also as described below, the server (or indeed any server) may be remotely controlled from any remote client station. FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x 16 spreading with CDMA codes on the transmit signals, and synchronization recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signaling of telephony information to, for example, up to 15 subscriber terminals (each via a respective one of 15 of the 16 modems). The shelf is controlled by a shelf controller (SC) 72.

Figure 4:
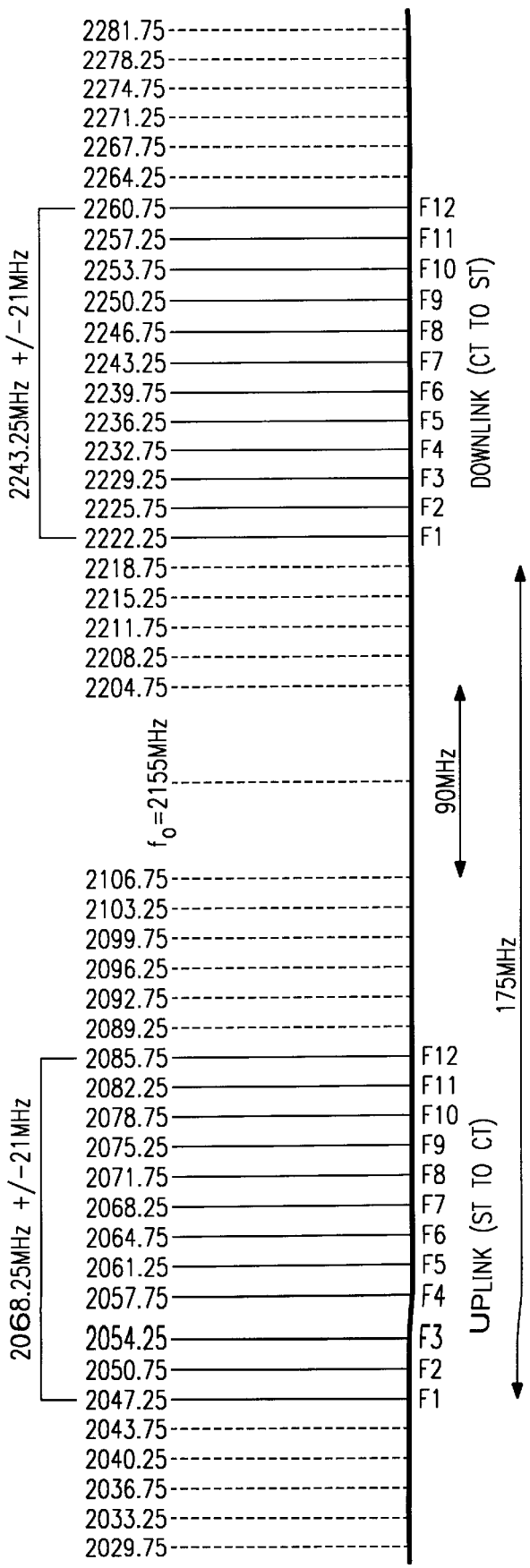
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighboring central terminal 10. To avoid, or at least to reduce interference problems caused by adjoining areas, only a limited number of the available frequencies will be used by any given central terminal 10.

Figure 5A:
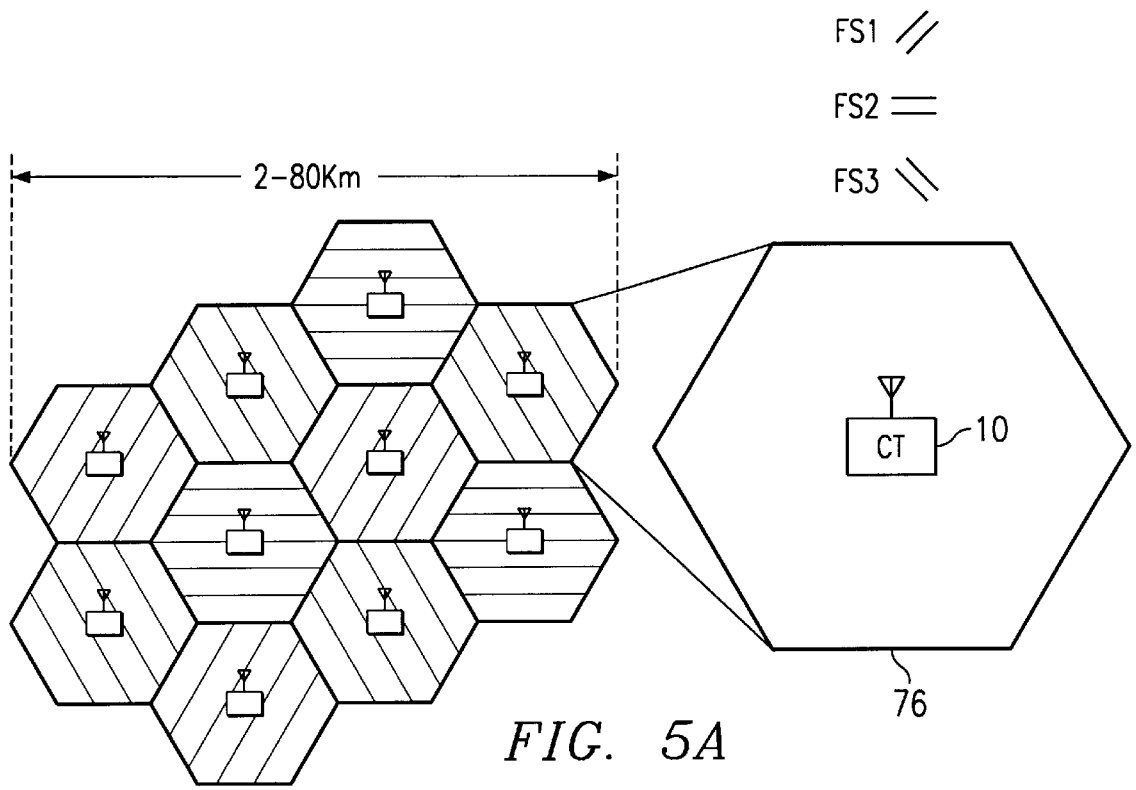
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
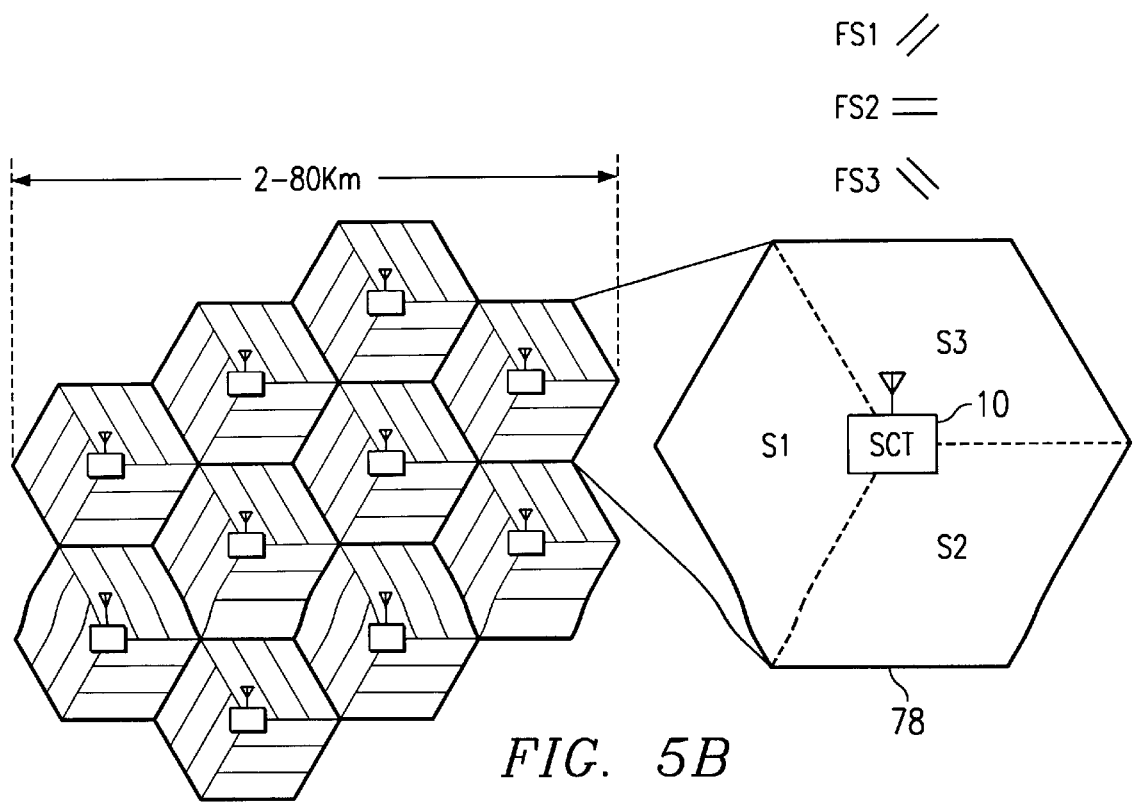

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

As mentioned above, each channel frequency can support 15 subscriber links. In this example, this is achieved using by multiplexing signals using a Code Division Multiplexed Access (CDMA) technique. As the form of the communication between the central station and the subscriber terminals is not relevant to the present invention, the CDMA technique will not be discussed in further detail herein. However, more details on CDMA encoding/decoding, and on the signal processing stages employed in the subscriber terminals and central terminal to manage communications between them, can be found in UK Patent application no. 9511546.5, filed Jun. 7, 1995.

Figure 6:
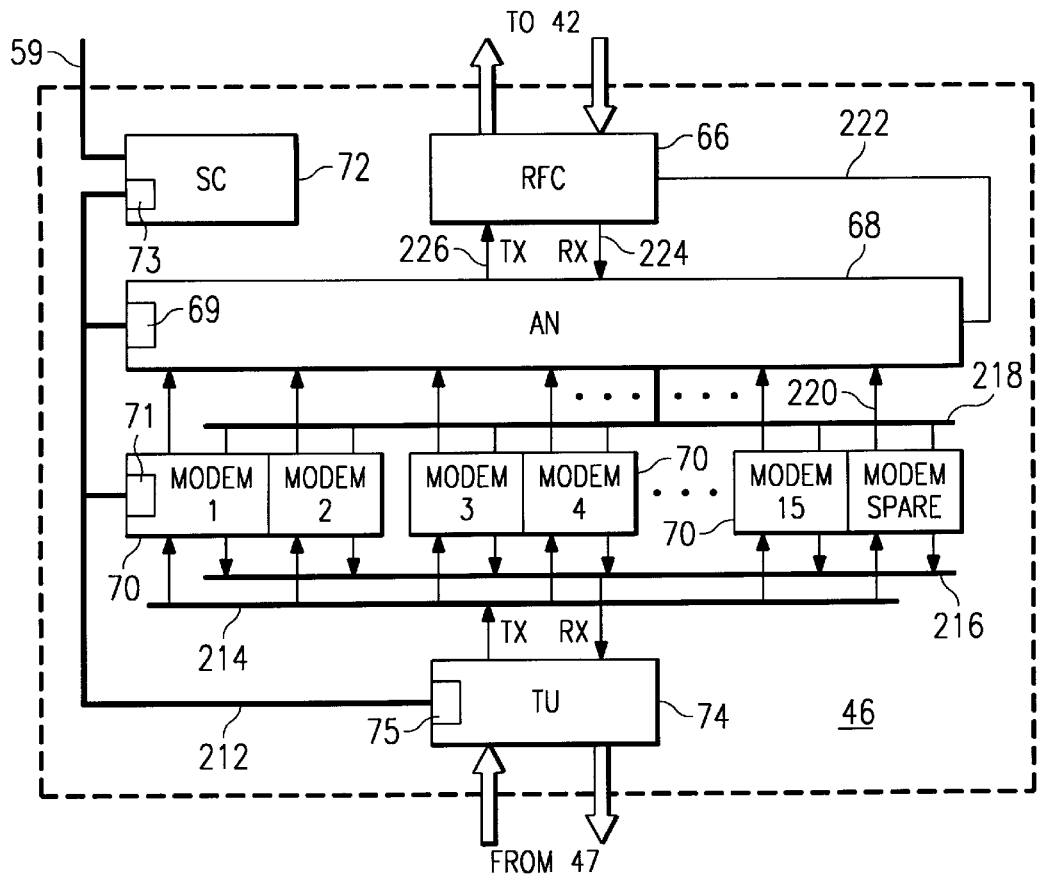
FIG. 6 is a schematic diagram illustrating in more detail the configuration of the modem shelf of FIG. 3A.

FIG. 6 is a schematic diagram illustrating in more detail the configuration of one of the modem shelves 46. The shelf controller 72 manages the operation of the whole of the modem shelf and its daughter network sub-elements (NSEs). The shelf controller (SC) 72 is provided with a RS232 serial port 59 for connection to the server 56 or to the pad 228. The shelf controller communicates control and data information via a backplane asynchronous bus 212 directly with the analogue card (AN) 68, the tributary unit card (TU) 74 and the modem cards (MC) 70. Other network sub-elements are connected via the modem cards. In a fully populated rack there will be four shelf controllers, one on each modem shelf. These four shelf controllers are configured to share the control of network service elements on other cards in the rack. The network service elements on the RF combiner shelf 42 are connected to the shelf controller backplane bus on each of the modem shelves. The shelf controller includes a master communications interface 73 for performing the communications functions mentioned above and other control functions. Each of the tributary card 74, the analogue card 68 and each modem card 70 includes a respective slave communications interface 75, 69 and 71, which manages the communications with the shelf controller 72. The RF card 66 is controlled from the analogue card 68, which is configured to provide the necessary control functions via the control path 222.

Also shown in FIG. 6 are the signal paths from an interface to the public switched telephone network (e.g via lines 47 in FIG. 3) and the interface to an RF combiner shelf 42.

The tributary unit 74 terminates the connection to the host public switched telephone network and handles the processing of telephony information for up to 15 subscriber terminals (up to 30 calls). The tributary unit 74 is 'on-line' in that it directly processes calls. The tributary unit 74 is also connected to a 2 Mb/s time-multiplexed (timeslot) transmit bus 214 and 2 Mb/s time-multiplexed (timeslot) receive bus 216 for transmit and receive calls, respectively.

The modems (1–15) on the modem cards 70 perform baseband signal processing of the transmit and receive signals including the convolution coding and spreading functions on the transmit signals, and the synchronization recovery, de-spreading and error correction functions on the receive signals, as described earlier. Each modem is connected to the tributary unit 74 via the transmit and receive buses 214 and 216, and to the analogue card 68 via a dedicated connection 220 to one of a number of ports on the analogue card and via a digital CDMA RCV bus 218. Each of these dedicated connections includes multiplexed I, Q and control transmit paths.

The analogue card 68 performs A-D/D-A conversions, baseband filtering and vector summation of the 15 transmit signals from the modem cards. The analogue card 68 also scales the transmit signal power level according to high or low power levels. It is connected to the modem cards via the dedicated connections 220 and the digital CDMA RCV bus 218.

The RF card 66 generates the modulated transmit RF signals (at medium power level) and recovers and amplifies the baseband RF signal from the subscriber terminals 20. The RF card is 'on-line' in that it passes up to 30 calls simultaneously via the 15 available links, all on the same RF carrier. The RF card is connected to the analogue card via transmit and receive paths 226 and 224, respectively. The RF card is also connected to power amplifiers of the RF combiner shelf on the transmit side and to a low noise amplifier on the receive side. The power amplifiers (not shown) in the RF combiner shelf amplify the medium power output of the RF card 66 to an appropriate transmit power plus an amount to cover losses during signal combination and in the antenna feeder cable for the transmit signal. The low noise amplifier (not shown) is a low signal amplifier for overcoming losses in the antenna feeder etc. for the receive signal. The transmit carrier modulation is performed by the RF card 66 using an 'IQ modulator' at intermediate frequency and a single conversion to RF. The receive output of the RF card is at baseband in 'IQ' format as per the transmit input to the RF card.

Figure 7:
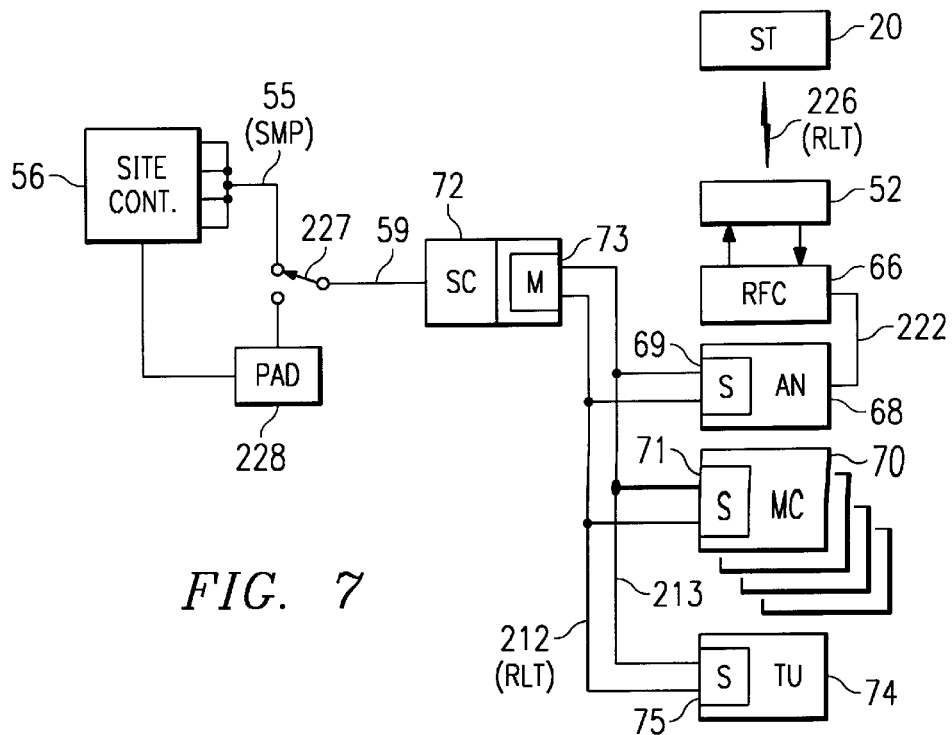
FIG. 7 is a schematic block diagram illustrating control protocols for a telecommunication system.

FIG. 7 is a schematic block diagram illustrating an example of various control protocols used for the transmission of control information between different parts of an example of a telecommunications system in accordance with the invention. It should be noted that FIG. 7 is directed to the control signal paths, and accordingly, the telephone call signal paths are not included. Many of the features of FIG. 7 have already been described above, and in this case the same reference numerals are used as before. Accordingly, these features will not be described again in detail.

A first protocol, called the Sub-system Management Processor (SMP) protocol, is used for communications between the shelf controller 72 and a server 56, or element manager 58, via lines 59 and 55, or 59 and 57, respectively. The first protocol is a balanced protocol with either party to a communication being able to initiate an exchange of information. As mentioned above, the shelf controller 72 is provided with an RS232 serial output for connection to a server 56 or to a pad 228.

A second protocol, called the Radio Link Termination (RLT) protocol, is used for passing control and data information via the control 212 and data 213 buses on the modem shelf. In addition, it should be noted that the same protocol is valid on the radio link 226 between the antenna 52 of the central terminal and the subscriber terminal(s) 20.

The second protocol is an unbalanced protocol with the microprocessor 73 in the shelf controller 72 acting as a busmaster (M) and the microcontrollers 69, 71 and 75 on the analogue card 68, the modem cards 70 and the tributary unit 74 acting as slaves. More details of the first (SMP) and second (RLT) protocols can be found in UK patent application 9510870.0, filed Jun. 2, 1995, to which the reader is referred for further details.

As mentioned above, the server 56 maintains an object model for control of the telecommunications system. The server and the object model 82 are so designed that control of the server (and hence the telecommunications system) is possible from a remote client station 64. The remote client station 64 may be a computer terminal or may be another server. Advantageously, control of the object model 82, and thus the telecommunications system, is accomplished by way of operations. These operations may be either update or retrieve operations which are applied to the object model to control the telecommunications system. Facets of the object model will be further described later.

Figure 8A:
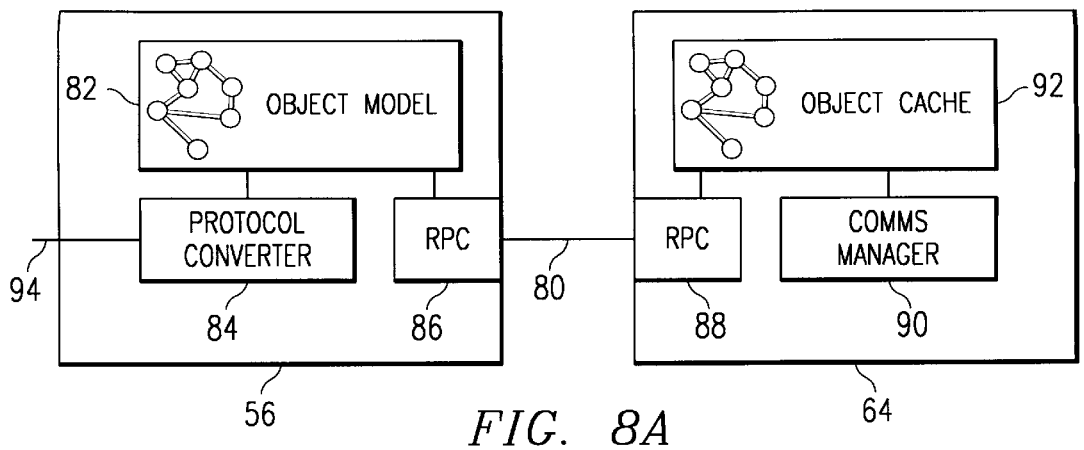
FIG. 8A illustrates a server which is connected via a data link to a client station.

FIG. 8A illustrates a server 56 which is connected via a data link 80 to a client station 64. The data link 80 may be any sort of link, either wired or wireless. Within the server 56 there are provided an object model 82, a protocol converter 84 and an RPC (Remote Procedure Call) interface 86. Similarly, within the client station 64, there are provided an object cache 92, a communications manager 90 and an RPC interface 88.

The protocol converter 84 in the server 56 receives SMP messages from the central terminal 10. Also provided, but not shown, is an interface through which the messages from the central terminal 10, via a data link 94, are received. The protocol converter 84 converts the received SMP messages into operations which are then applied to the object model 82 to control the telecommunications system. The SMP to operation conversion process will be described in detail later.

Previously, the object cache 92 in the client station 64 would maintain therein a map of the entire network to which that client station is connected. That map would include a copy of the object model 82 maintained in the server 56. However, as discussed earlier, this causes certain performance and memory problems, and hence, in accordance with preferred embodiments of the present invention, only a portion of the object model 82 will be stored in the object cache. This will be discussed in more detail later.

The communications manager 90 and the RPC interfaces 86 & 88 allow the creation and maintenance of reconfigurable dynamic interfaces between the client station 64 and, in this example, the server 56. This will also be discussed in more detail later.

Figure 8B:
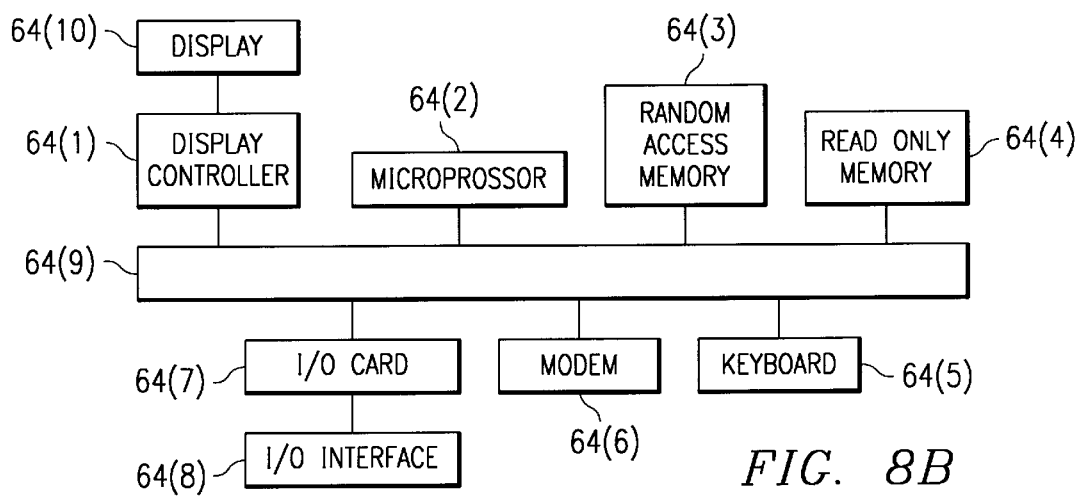
FIG. 8B illustrates an example of a suitable hardware configuration for a client station.

FIG. 8B illustrates an example of a suitable hardware configuration for a client station 64. With reference to FIG. 8B, the client station 64 may comprise a display controller 64(1), a microprocessor 64(2), a random access memory 64(3), a read only memory 64(4), a keyboard 64(5), a modem 64(6), an I/O card 64(7), an I/O interface 64(8), a common bus 64(9) and a display 64(10).

The display controller 64(1) controls the display 64(10) and allows the display of information to a user using the client station 64. The display controller 64(1) controls such functions as the display refresh rate and other commonly known functions. The display controller 64(1) is in communication with other components of the client station 64 so that information may be routed from the other components via the common bus 64(9) for display to the user.

The microprocessor 64(2) provides global control of the client station 64 and, as such, provides a means for a user to execute control functions in the client station 64. The random and read only memories 64(3) and 64(4) provide a memory in which the object cache 92, communications manager 90 and remote procedure call interface 88 may be maintained. The memories may also provide storage facilities for other information to be used within the client station 64 and beyond.

The keyboard 64(5) provides a means for a user to input commands to control the functions maintained in the memories. Alternative input devices may also be provided such as a mouse, trackerball or other commonly available devices.

The modem 64(6) provides a means for connecting the client station 64 to a remote server station via a telephone line, for example. Instructions generated by the functions maintained in the memories may be passed to the modem for conversion into a suitable format for broadcast down a telephone line.

The I/O (Input/Output) card 64(7) controls the I/O interface 64(8) and, as such, provides a means for connecting to remote devices by way of a serial or parallel port. Alternative I/O devices may also be provided to enable connection to a remote device via a network, for example. The I/O interface is, for example, a serial or a parallel port.

Whilst the client station 64 may be an ordinary personal computer, the performance of the device may be dramatically improved by providing dedicated read only memories for the object cache, comms manager and remote procedure call interface control functions. Variables used and generated by these functions may then be stored and manipulated by way of the random access memory. Such an arrangement would afford more memory to the processing of instructions and the generation of data.

It will also be understood that the representation of the client station in FIG. 8B is only a schematic and that many additional or alternative components may be provided if desired.

Figure 9B:
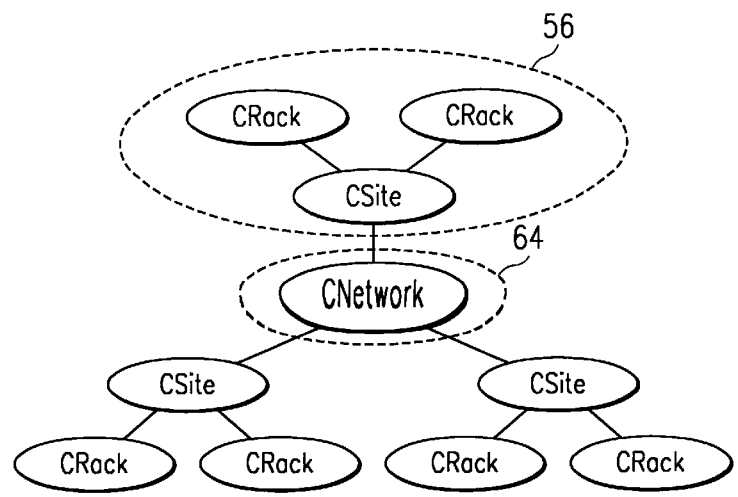
FIG. 9B illustrates a full network object relationship that can be maintained in a client station object cache.
Figure 9A:
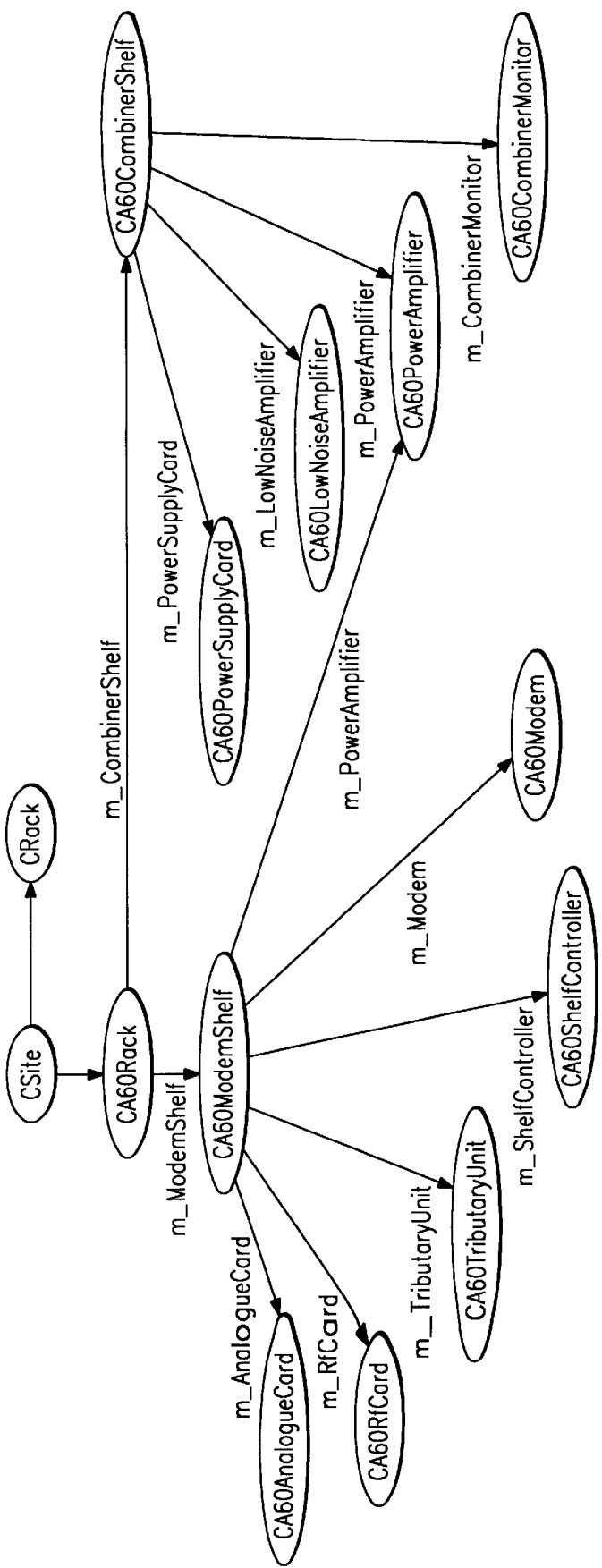
FIG. 9A is a schematic overview of a server and illustrates the relationship between various server objects.
Figure 9C:
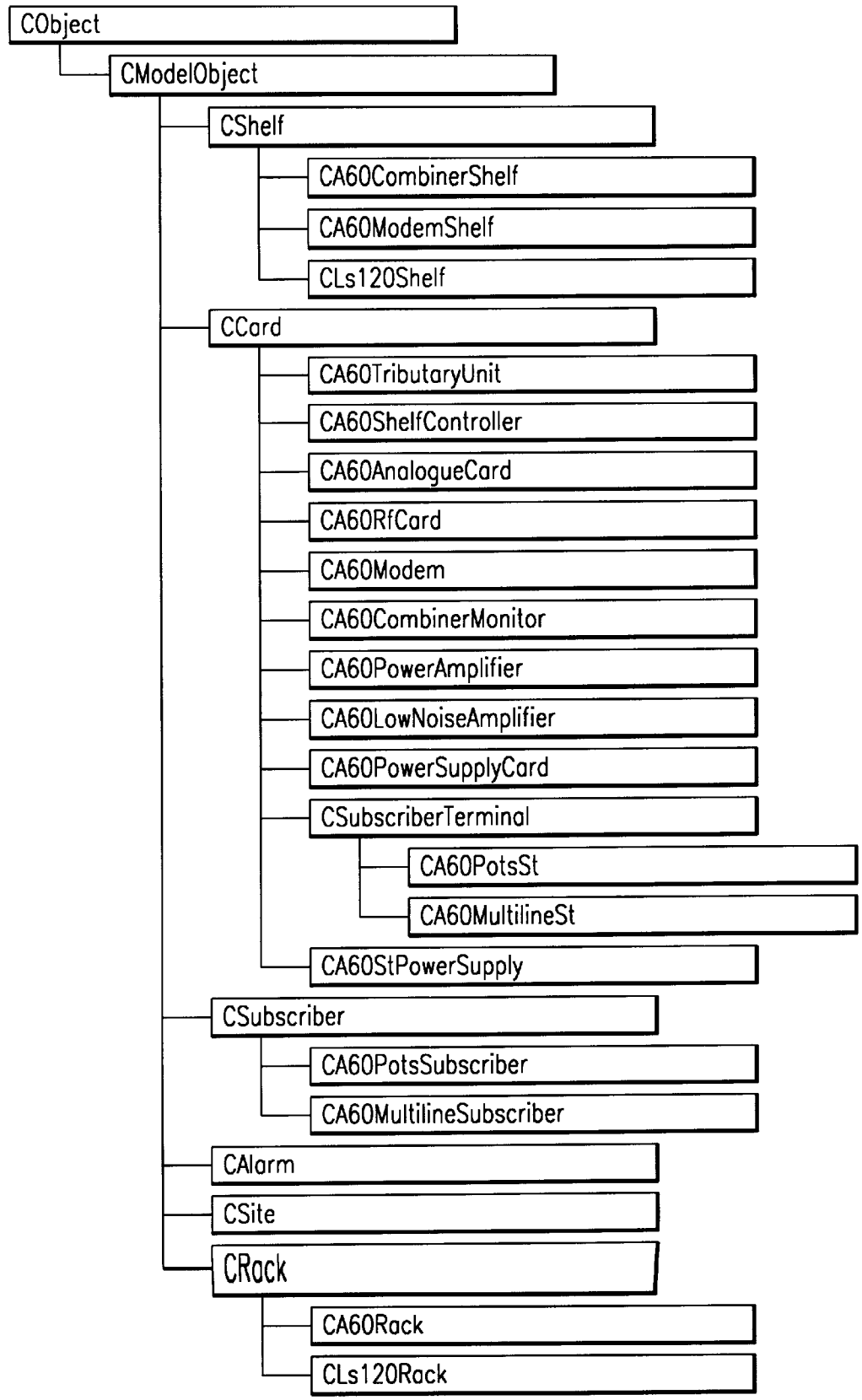
FIG. 9C provides one possible overview of a server object model.

Returning to the object model 82 maintained in the server 56, FIG. 9A is a schematic overview of the server and illustrates the relationship between various server objects. The management and control of the telecommunications network including the central terminal, the subscriber terminals and the server, is based on the hierarchical object-based data structure formed by the object model 82. FIG. 9C provides one possible overview of that data structure.

With reference to FIG. 9A, there is shown the object model 82 maintained by a server station 64 for a site as described above. A site object (CSite) is shown as having a plurality of equipment racks (represented by the CRack and CA60Rack objects) associated therewith via two arms extending from the site object. One arm of the site, the CA60Rack arm, has been expanded. Any number of racks may be provided at any one site.

As shown in FIG. 9A, the expanded CA60Rack arm has a plurality of objects associated therewith. Each of these objects relate to the control of a specific component of an equipment rack. As shown in FIG. 3, each rack comprises a RF combiner shelf 42, a power supply shelf 44 and a number of modem shelves 46. Each modem shelf, as shown in FIG. 3A, may comprise a RF card 66, an analogue card 68, a tributary unit card 74, a shelf controller 72 and at least one modem card 70. As shown in FIG. 9A, each component of the server station has an object associated therewith. Thus, the CA60AnalogueCard object, for example, enables control of the analogue card 68 on the modem shelf 46. Similar relationships exist between the other objects of FIG. 9A and the various components of the server station.

FIG. 9B illustrates the full network object relationship that can be maintained in the client station object cache 92. When an operation is applied to the object model 82 from a client station 64, that operation may also be applied to the object structure maintained in the object cache 92 so that the state of any object in the object model 82 is readable from the client station object cache 92. The server station 56 object model has been indicated on FIG. 9B and the client station 64 object model is represented by the network object (CNetwork). However, as will be discussed later, in preferred embodiments, the client station will only retain in its object cache 92 a portion of the object model 82 maintained on the server 56.

As may be seen from FIG. 9A, and as mentioned above, the object model 82 in the server 56 essentially comprises an object for each component of the central terminal 10 (or central terminals) managed by the server.

FIG. 9C provides one possible overview of the relational data structure illustrated in FIG. 9A. With reference to FIG. 9C, there is shown a CObject having a CModelObject child. The CModelObject has CShelf, CCard, CSubscriber, CAlarm, CSite and CRack children. These children have the CModelObject as their parent. Children may be created or destroyed and in order to implement the services of a child, one must first implement the services of the parent. Moving from parent to child is known as moving down the tree, whereas moving from child to parent is known as moving up the tree.

The CModelObject is known as the base class and comprises a multiplicity of basic services and data. The important data of the base class provides, as public data, pointers to the parent and children of any object in the object model 82. As protected data, the base class provides an array of derived classes listing all parents and children in the object model 82. As public services, the base class provides an update operation and a retrieve operation. The update operation is routed to its destination object with the aid of the data mentioned above and then used to update that destination object with state information embedded in the operation. The retrieve operation is routed to its destination object in a similar manner, where it is filled by the state information of that destination object. As protected services, the base class provides a routing operation which routes an update or retrieve operation to its destination object and then invokes a handling service to apply the operation. If the destination is not in existence at the time of the operation's arrival a create child service is called to create the destination object.

To summarize, the base class contains services and data that may be applied to an object by calling an update operation from any object above the destination object, routing the operation to the destination object and then applying it. The state of any object may be obtained, in a similar fashion, by the retrieve operation. The routing, handling and creating of operations form the core functions of the CmodelObject base class.

Operations are invoked by the operation construction service which is part of an operation base class. Other services provide information relating to the size and type of suitable operation code.

All operations are reversible. This reversible nature is provided by four data classes which provide an address of the destination object, a flag indicating whether the operation is invertible, a before state and an after state. When an update operation is sent to a destination object in response to a call from that destination object or from any other object, the operation contains parameters embedded therein that provide state changes that are to be made to the destination object. These parameters are stored in the after state of the operation. Upon arrival of the operation at the destination object and before application of the parameters to the destination object, the current state parameters (i.e., the destination object's state prior to application of the operation) are stored in the before state. The parameters stored in the after state may then be applied to the destination object to effect a change therein. When the before state is filled, the invertible flag is implemented to indicate that the operation is now reversible.

The resulting operation now comprises an address identifying the destination object, a before state of the object, an after state of the object and a flag indicating that the operation is reversible. If it is desired to reverse the operation, the state information from the before state is removed, applied to the object and the invertible flag is removed. This mechanism easily enables operations to be reversed by a fast "block copying" process whereby the before and after states are reversed.

This arrangement provides a significant improvement over previous arrangements which relied upon the generation of inverse operations to effect the reversal of a change to an object.

Some of the other objects illustrated in FIG. 9C will now be described in more detail below. Each of the objects includes a name field defining the name of the object and a status field containing status information about the object. The object may also contain one or more alarm parameters which can be set in response to specific alarm conditions relating, for example, to hardware errors, line malfunctions etc. The status field for an object includes a fault parameter which becomes set when at least one alarm parameter in the object or in a dependent object is set. In other words, when a fault parameter is set in one object, this fault status is propagated up the tree using the pointers to successive parent objects. Each of the objects also contains a definition of the object which can be used for displaying a representation, or view, of that object.

There is typically one site object (CSite) in the object model. This contains data about the site and is created automatically when the object model is initialized. As well as a name field and a status field, this object contains a field defining the site location and a list of rack objects that the site contains.

The CRack object has CA60Rack and CLs120Rack children, for example. Each child represents a rack and contain data about the rack including a name field, a status field, a pointer to the site object (CSite), and pointers to a shelf object.

The CCard object has, amongst others, a tributary unit object child (CA60TributaryUnit), a shelf controller object child (CA60ShelfController), an analogue card object child (CA60Analogue Card), a RF card object child (CA60RFCard), a modem object child (CA60Modem), a combiner monitor object child (CA60CombinerMonitor), a power amplifier object child (CA60PowerAmplifier), a low noise amplifier object child (CA60LowNoiseAmplifier), a power supply card object child (CA60PowerSupplyCard) and a subscriber terminal object child (CSubscriberTerminal).

The CShelf object has a CA60CombinerShelf object child which represents an RF combiner shelf and contains data about the combiner shelf including a name field, a status field, a pointer to the containing rack object (CRack), a pointer to the shelf's low noise amplifier card object (CA60LowNoiseAmplifier), and pointers to power amplifier card objects (CA60PowerAmplifier).

A modem shelf object child (CA60ModemShelf) of the CShelf object represents a modem shelf and contains data about the modem shelf including a name field, a status field, a pointer to the containing rack object (CA60Rack), an identifier field for the position of the shelf in the rack, a field for the identity of the serial port through which the site controller communicates with the shelf, a field for the baud rate for the serial port, a pointer to the shelf controller card object (CA60ShelfController), a pointer to a tributary card object (CA60TributaryUnit), a pointer to the RF card object (CA60RFCard), and pointers to a plurality of modem card objects (CA60Modem).

The modem card objects (CA60Modem) each represent a modem card and contain data about the card including a name field, a status field, a pointer to the modem shelf object (CA60ModemShelf) containing the modem card, an identifier number for the modem card and pointers to modem objects.

The shelf controller card object (CA60ShelfController) represents a shelf controller and contains data about the card including a name field, a status field and a pointer to the modem shelf object (CA60ModemShelf).

The Tributary unit card object (CA60TributaryUnit) represents a tributary card and contains data about the card including a name field, a status field, a pointer to the modem shelf object (CA60ModemShelf), pointers to the card's tributary unit channels and a definition field for the protocol used by the tributary card.

The low noise amplifier card object (CA60LowNoiseAmplifier) represents an RF combiner shelf low noise amplifier card and contains data about the card including a name field, a status field and a pointer to an RF combiner shelf object.

The power amplifier card object (CA60PowerAmplifier) represents an RF combiner shelf amplifier card and contains data about the card including a name field, a status field and a pointer to the RF combiner shelf object.

In this way, a simplified hierarchical object-based control structure (forming an object model) is provided that is controllable by way of two operations. This technique also improves the "connectability" of the object model as any input control data protocol may be converted into at least one of the above mentioned operations. Thus, a suitable protocol converter will allow the object model to control any type of attached equipment regardless of the control data protocol adopted by that equipment. Just such a protocol converter will be later described below.

Figure 10:
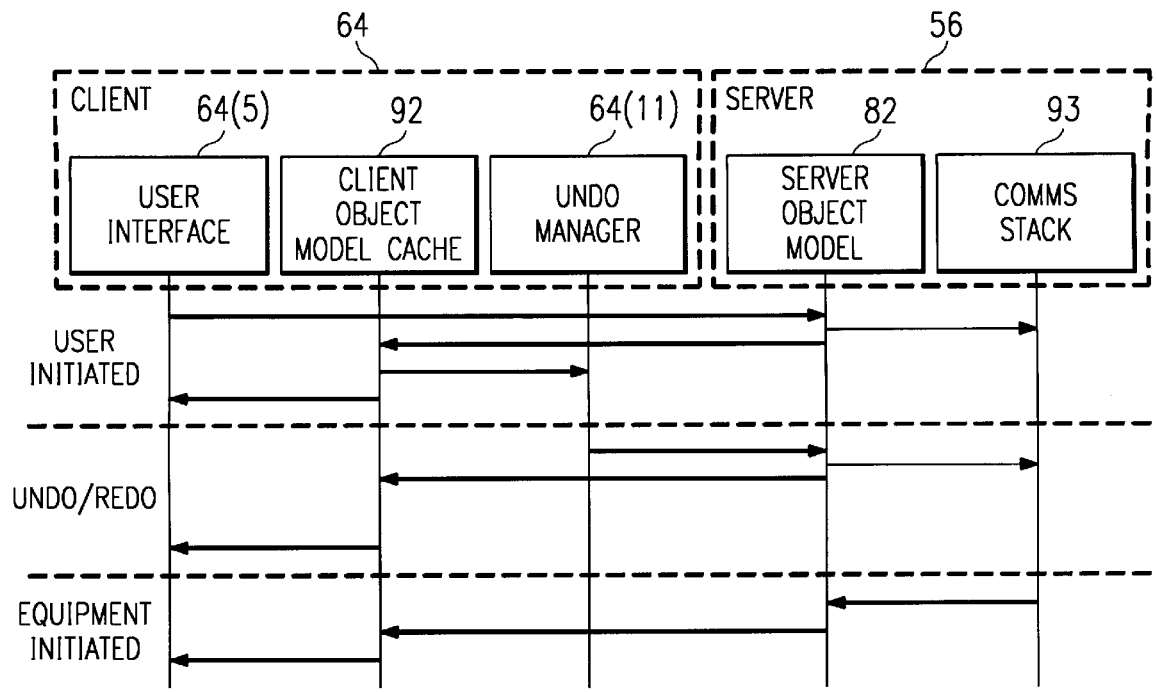
FIG. 10 illustrates the flow of operations between the client station 64 and the server station 56 in response to commands issued by a user, or by equipment in the telecommunications system.

FIG. 10 illustrates the flow of operations between the client station 64 and the server station 56 in response to commands issued by a user, or by equipment in the telecommunications system.

With reference to FIG. 10, there are illustrated three mechanisms of operation manipulation and generation: "user initiated", "undo/redo" and "equipment initiated". These mechanisms provide a purely exemplary indication of the operating manner of the object based control system and are not to be considered as limiting the operation of the system to the three mechanisms alone. Indeed, it will be understood that a number of other mechanisms will also be provided to control the control system.

The "user initiated" mechanism will now be described. A user at the client station 64 enters commands via the user interface 64(5) (which may be a keyboard or other input device) to control the telecommunications system. These commands are converted into a suitable protocol by a later described arrangement and passed to the server object model 82 maintained in the server 56. The commands are applied to the server object model 82 and cause changes in that object model. These changes are communicated to a communications stack (comms stack 93) generated by the protocol converter 84 in a manner to be later described, and from there to the telecommunications system for control thereof. Simultaneously, these changes are preferably communicated and applied to the object model maintained in the client object model cache 92 so that the client object model is in agreement with the server object model. These changes are then communicated to the user interface 64(5) where they cause an update of the user interface 64(5) that communicates to the user that their commands have been executed. The changes are also communicated to an undo manager 64(11) maintained in the client station that manages the reversing of operations within the control system.

In this way, the user is able to invoke control changes in the server object model and the attached telecommunications system and be appraised when those control changes have been made. The user is also provided with the facility to reverse those changes, or to redo those changes if desired via the "undo/redo" mechanism.

The undo/redo mechanism will now be described. As described earlier, immediately prior to the application of an operation to an object, the state of that object is copied to a "before" state of the operation. The state parameters contained in the "after" state of the operation may then be applied to the object so as to effect a change in that object. If a user desires to effect a reversal of a change to an object, the state parameters stored in the before state of the operation are block copied to the after state and applied to the object concerned. Similarly, if a user wished to invoke a repeat application of the operation to the object, the state parameters of the object (which are now identical to the original after state parameter) may be retrieved into the after state of the operation and subsequently reapplied to the object.

FIG. 10 shows such an "undo/redo" procedure. Issuance of an undo or redo request by a user via the user interface 64(5) results in the application of the appropriate operation to the object model 82 maintained in the remote server 56. Application of that operation to the object model causes a change in that object model and the change is communicated to the object model maintained in the client object model cache 92 so that the object model cache is in agreement with the server object model. The change may also be communicated to the telecommunications system via the comms stack 93 thereby to control the telecommunications system. The changes communicated to the client object model cache 92 would similarly change the object models maintained in that cache and those changes may be communicated to the user via the user interface 64(5) so as to inform the user that the undo/redo instruction has been executed.

In addition to user initiated commands from the client, the telecommunications system will generate messages that are applied to the server object model 82 and effect changes in that object model. Such an occasion is illustrated in the "equipment initiated" mechanism. These messages may be error messages, for example. The changes in the server object model 82 are communicated to the object model in the client object model cache 92 and from there to the user interface to appraise the user of the "equipment initiated" changes to the telecommunications system.

In this way, the use of an object based control system relying on two fundamental operations greatly facilitates the communication of information between stations of the communications control system.

Figure 11:
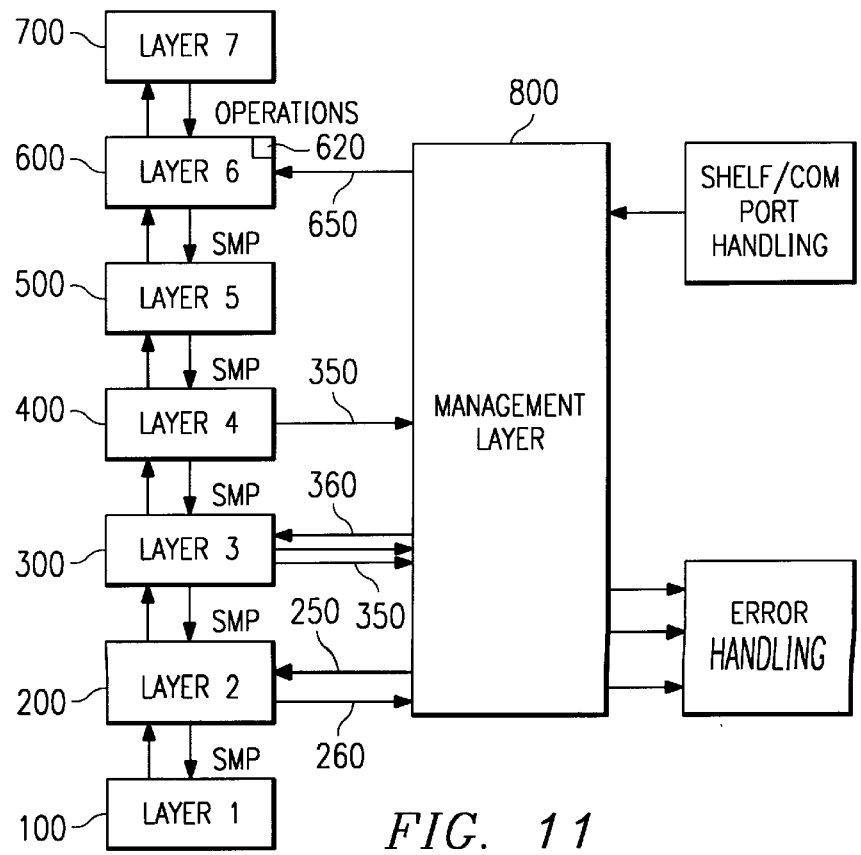
FIG. 11 illustrates schematically a possible configuration for a comms stack of a protocol converter.

As mentioned above, the protocol converter 84 maintained in the server 56 converts SMP messages from the central terminal 10 into operations for control of the object model 82 maintained in the server 56. FIG. 11 illustrates schematically a possible configuration for the protocol converter 84.

The protocol converter can be thought of as having a plurality of layers, shown as layers 1 to 7 in FIG. 11. The seven layer protocol converter adopts the Open Systems Interconnection (OSI) reference model and thus conforms to international standards. This seven layer architecture is collectively known as a communications stack or comms stack 93—as shown in FIG. 10—and will be referred to as such hereinafter. The protocol converter 84 dynamically assembles a comms stack whenever it receives an SMP message (or other protocol message) from the telecommunications system that is to be converted into at least one operation. The comms stack is then disassembled after the at least one operation is communicated and applied to the server object model 82. Advantageously, the protocol converter can assemble and maintain a plurality of these comms stacks at any one time.

One of these comms stacks will now be described. A first layer 100 of the comms stack is the hardware, which in this case is the above mentioned interface between the control station 10 and the server 56.

A second layer 200 is a data link layer for transferring bytes of the message packets to and from the first layer and beyond. The second layer may be, for example, an RS232 link or a parallel port connection. The second layer 200 receives corn port settings (arrow 250) and notifies errors (arrow 26) from and to a management layer 800.

A third layer 300 is a network layer for establishing connections between an object in the server and the second layer or an object in the server and a fourth layer, and for authenticating the identity of received SMP message packets. Authentication may be attained by a variety of well known methods, some of which have been described in detail in United Kingdom Patent Application No. 9511192.8. One means for invoking authentication will be later described with reference to FIG. 12.

The fourth layer 400 is a transport level. The transport level constructs frames of data from message packets received in the third layer. The fourth layer also detects and corrects errors in those third layer message packets. In addition, the fourth layer 400 destructures frames of data received from a sixth layer, via a fifth layer, into first protocol message packets. The fourth layer detects and corrects errors in the sixth layer message packets and transmits the corrected message packets to the third layer.

The fifth layer 500 performs no function in the comms stack herein described. That is to say, the fifth layer 500 serves only as a means for routing signals from the fourth layer to the sixth layer. It is, however, possible that some of the functions performed by other layers may be replicated here if desired. For example, the fifth layer could provide yet further error and security checking and correction if desired.

The sixth layer 600 is a presentation layer for encoding fourth layer first protocol message packets into operations, and for decoding operations from a seventh layer into first protocol message packets. These operations are, as mentioned above, either update or retrieve operations and contain target object information received via arrow 650—the significance and operation of the operations will be further described below.

The seventh layer 700 is an application layer applying the operations from the sixth layer to the object model 82 in the server 56. Similarly, the seventh layer 700 also passes operations from the object model 82 to the sixth layer 600 for conversion to SMP data frames.

Supervising operation of the comms stack 93 is a management layer 800 that is responsible for the comms stack and for managing errors outside of the scope of individual layers of the comms stack. The management layer 800 is capable of receiving information regarding the operation of the com ports and modem shelves and passing this information to the comms stack for correction of errors and authentication of message packets. The management layer 800 also manages the assembly and disassembly of comms stacks, as required.

From the above, it is apparent that the critical conversion of SMP message packets, or other protocol message packets, into operations, and vice versa, takes place in the sixth layer 600 of a comms stack of the protocol converter 84.

As mentioned above, operations are either update or retrieve operations. Update operations change the parameters of an object whereas retrieve operations obtain state information for a given object or piece of equipment. The operations are wholly and easily reversible and comprise a series of bytes. Generally, operations are constructed in a buffer laid out thus:

| | |
|---|---|
| 2 Bytes | Operation type code |
| 1 Byte identifier | Number of bytes in a target path |
| N Bytes | Bytes of the target path identifier |
| 1 Byte | Invertible flag |
| N Bytes | Before State |
| N Bytes | After State |

The before state is the state of an object to which an operation is to be applied before the operation has been applied to that object. The after state is the state of the same object after the operation has been applied thereto. An operation is only reversible and the invertible flag will only be implemented when both the before and after states have been filled.

The conversion process will now be described. SMP messages from the central station 10 are processed by preceding layers of the comms stack such that discrete message packets are presented to the sixth layer for conversion into operations.

As a first step, the sixth layer executes a read procedure which reads SMP message packets, or other protocol message packets, into a buffer for conversion into an operation. At this stage a variety of different procedures are preferably provided to cover eventualities where an incoming message has been corrupted by, for example, a failure of a piece of equipment or a loss of power.

Next, the sixth layer checks the status of the system element from which the message was transmitted and returns the state information for that element. The state information includes, amongst other information, the address of the element from which the message was transmitted and the address of its shelf. Various checks may be made at this point to ensure that the address of the system element and the shelf are valid.

Using the address of the shelf as a starting point, a search through an "SMP message to operation" conversion table 620 (or other protocol conversion table) is conducted and an operation address is retrieved that points to the object within the server that is to be changed. The conversion table is maintained in the sixth layer of the comms stack and is shown schematically in FIGS. 11, 14 and 15.

Next, change parameters (i.e. a state to which the server object is to be changed) are retrieved from the SMP message, or other protocol message, and added to the "after" section of the operation and the address of the object to which the operation is to be applied is added to the path identifier. The preferred format of the address will be discussed later with reference to FIG. 18. The complete operation is then passed to the seventh level 700 for application to the object in the server 56 identified by the path identifier.

In this way, the comms stack of the protocol converter receives SMP messages from the central station 10 and any other connected equipment and converts these messages into operations for application to the object in the server. The process may be reversed so that operations from the object in the server are converted into SMP messages for application to and control of the central station 10.

By providing a suitable conversion table, the protocol converter may be used to convert messages from other types of equipment manufactured by different manufacturers. Thus, the server herein described may be connected to any central station 10 of a telecommunications network.

Figure 12:
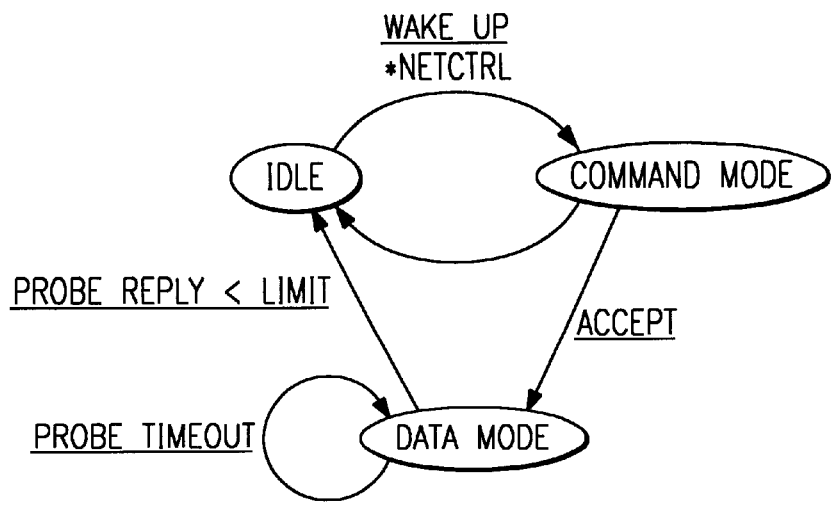
FIG. 12 shows one means for invoking authorization in the third level of the comms stack.

FIG. 12 shows one means for invoking authorization in the third level of the comms stack. With reference to FIG. 12, a state diagram for the third level authorization invocation is shown.

In order to invoke authorization, the third level of the comms stack generates probe messages that are periodically sent to a shelf controller in the control terminal of the telecommunications system. The probe message is a sequence that may be inserted anywhere in the message sent from the third layer. Upon generation, the probe is inserted in a message packet that is sent from the third layer to the second layer where the message packet is disassembled into bytes for subsequent communication to the shelf controller.

Upon receipt of the probe, the shelf controller sends a reply which can occur anywhere in the message from the shelf controller. When the reply is received by the third layer, the third layer resets a timeout and removes the reply message from the message.

If no reply is received from two outgoing probes, for example, the third layer assumes that an error has occurred and that the comms stack is no longer in communication with the shelf controller. The third layer then goes into an authentication mode and disconnects the links between the second and fourth layers of the comms stack.

With reference to FIG. 12, upon creation the third layer is in an idle state (IDLE). When a "wakeup" string is sent by the shelf controller and recognized by the third layer a command state (COMMAND) is entered and a function *NETCTRL is sent out from the third layer to the shelf controller. If the shelf responds with an acceptance message (ACCEPT), a data mode (DATA) is entered. If no acceptance message is received from the shelf controller, the third layer returns to the idle state (IDLE).

The data mode (DATA) enables the movement of messages from the second layer to the fourth layer via the third layer. The data mode (DATA) also causes probes to be periodically generated and sent out to the shelf controller as indicated by the probe timeout loop (PROBE TIMEOUT) loop in FIG. 12. If the shelf controller fails to reply to the probe, the third layer returns to the Idle state, assumes that an error has occurred and invokes an authorization process.

Figure 13:
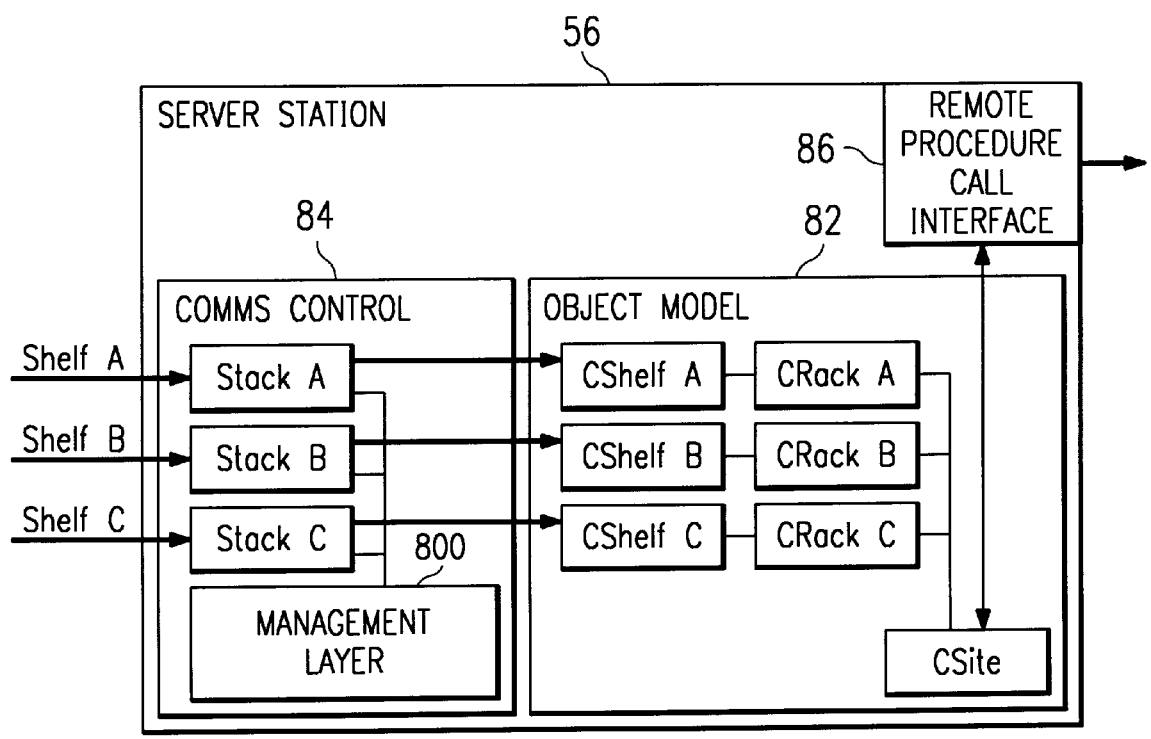
FIG. 13 illustrates a practical embodiment where the protocol converter communicates with a number of different telecommunications system central stations.

FIG. 13 illustrates a practical embodiment where the protocol converter communicates with a number of different pieces of central terminal equipment (as referenced by Shelf A to Shelf C).

As mentioned above, the protocol converter dynamically assembles and disassembles comms stacks when operations are received from the server object model and when messages are received from attached equipment in the telecommunications systems. FIG. 13 illustrates a scenario where three shelf controllers are attempting to interface with the server station 56. These three shelf controllers are referenced as Shelf A, Shelf B and Shelf C and may be resident on the same central terminal or on different central terminals to which the server 56 has access.

When the management layer 800 of the protocol converter 84 detects that a shelf is trying to interface with the server station 56, the management layer 800 constructs a comms stack for each piece of equipment attempting the interface. These comms stacks are shown in FIG. 13 as Stack A, Stack B and Stack C. These stacks receive messages from the shelves and convert those messages into operations for subsequent application to the server object model 82.

The management layer 800 maintains a list of all the connected ports and shelves in the server object model 82. Each item in that list has a pointer to the third layer of the comms stack which has been, or is to be, constructed for that equipment. Similarly, the messages generated by the sixth layer include a pointer to the correct object in the server object model. For example, as shown in FIG. 13, the messages from layer six that are to be applied to a CShelf A object in the server object model 82 would include a pointer to that object. The object model is also provided with pointers to list items in the management layer 800.

When an operation is sent from the object model to the equipment, the object model reads the pointer to the list item and sends the operation to the sixth layer via the item that it has a pointer to. Similarly, when an operation is sent to the server object model, that operation is sent to the object pointed to by the pointer in the list maintained in the management layer 800.

To summarise, a stack uses a pointer to an object in the object model in order to route operations from the stack to the object in the object model. Similarly, the object model uses a pointer to route operations back into the correct stack. These pointers are maintained in the management layer's list mentioned above.

Operations received by the object model may be applied in the normal way to invoke changes in the telecommunications system. In addition, a remote client station 64 may be used to remotely control the server 56 by way of the remote procedure call interface 86 as will be later described.

Figure 14:
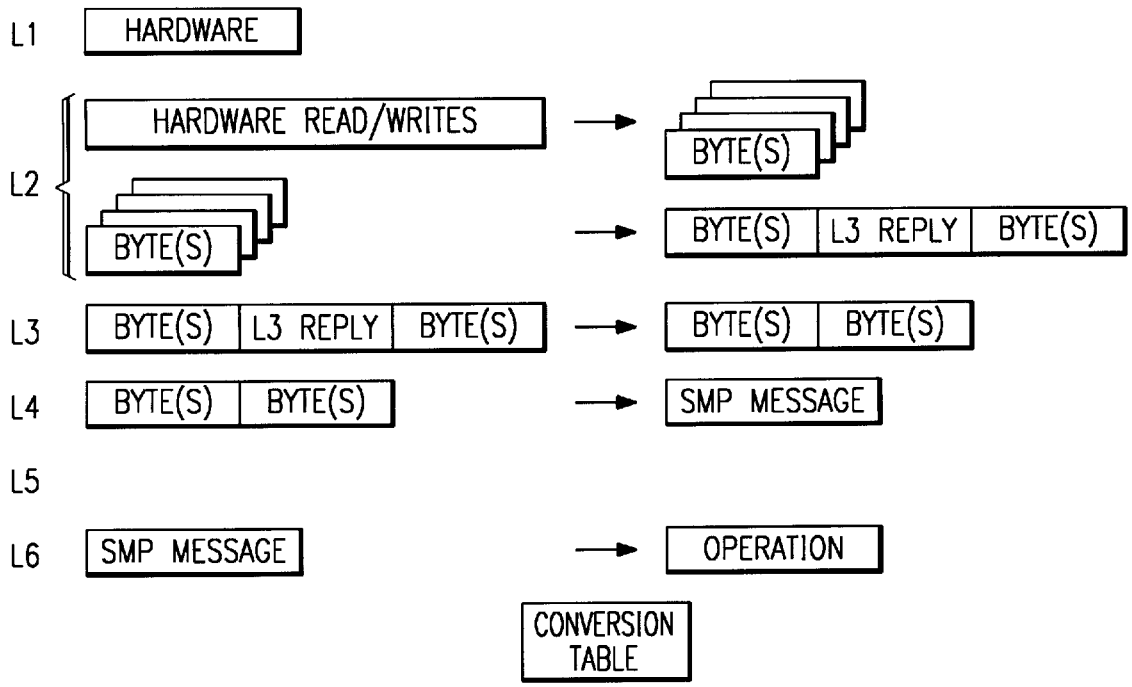
FIG. 14 illustrates a read operation carried out in the comms stack of FIG. 11.

FIG. 14 illustrates a read operation carried out in the comms stack of FIG. 11 to convert SMP (or other format) messages into operations. The black, upward arrows in FIG. 11 indicate this read procedure.

With reference to FIG. 14, messages arrive at layer 1 (L1) of a comms stack for conversion to an operation. As mentioned above, the first layer (L1) is the hardware which in this case is an interface such as a com port or parallel port etc. The second layer (L2) reads data from the interface to generate a plurality of data bytes (BYTES). These bytes are grouped into convenient packets for transfer to the third layer (L3). As mentioned above, the layer two packets may contain reply messages to any probes that had been previously issued by the third layer of the comms stack in a write procedure that will be later described below.

The third layer (L3) receives these message packets from the second layer (L2) and removes any probe replies. The resulting bytes are then transferred to the fourth layer (L4) where they are converted, as described above, into an SMP format. The SMP messages are then transferred to the sixth layer (L6) via a fifth layer (L5) which may have no function. The SMP messages received by the sixth layer (L6) are then converted into operations, by reference to the appropriate conversion table 620, for subsequent application to the server object model 82.

Figure 15:
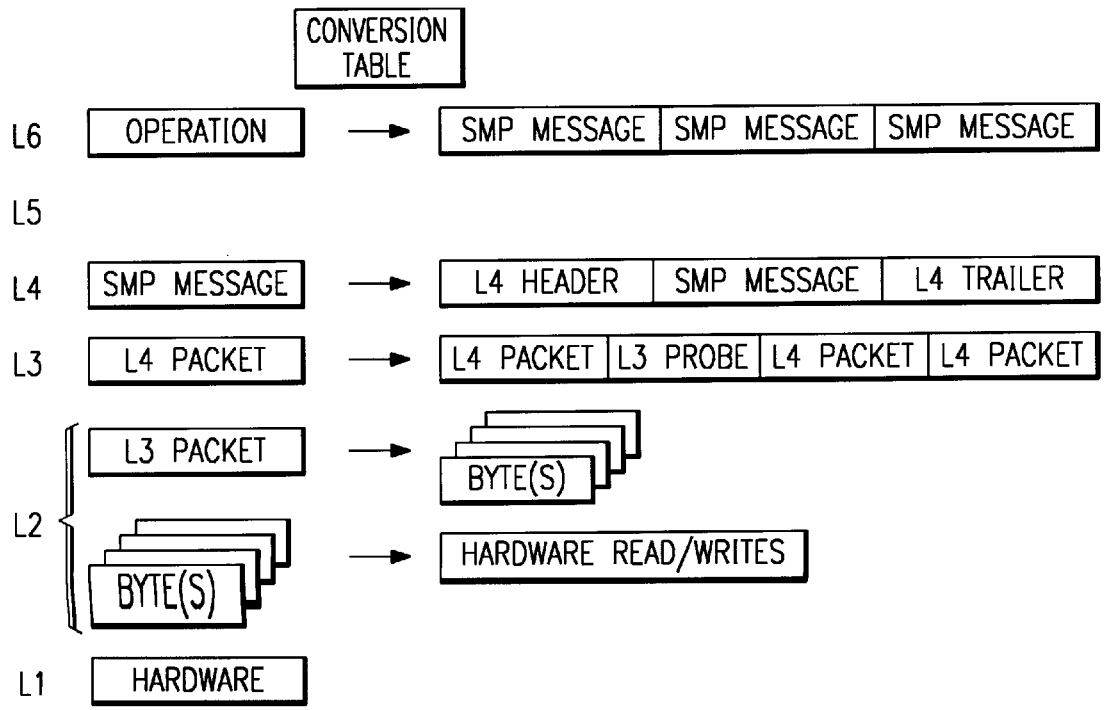
FIG. 15 illustrates a write operation carried out in the comms stack of FIG. 11.

FIG. 15 illustrates a write operation carried out in the comms stack of FIG. 11 to convert operations into SMP (or other format) messages. The downward arrows in FIG. 11 indicate this write operation. FIG. 15 illustrates a complementary opposite process to the process illustrated in FIG. 14.

With reference to FIG. 15, operations are received from the server object model 82 by the sixth layer (L6) of the comms stack. These operations are converted into a plurality of SMP Messages, by reference to the appropriate conversion table 620, and passed via the non-functioning fifth layer (L5) to the fourth layer (L4).

The fourth layer (L4) adds a fourth layer header and a fourth layer trailer to each of the SMP messages from the sixth layer (L6) to generate a fourth layer message packet (L4 PACKET). The fourth layer message packets are then passed to the third layer (L3) where a plurality of them are grouped together and a probe message is added if required. The resulting layer three packet is then passed to the second layer (L2).

The second layer (L2) disassembles the received third layer packets into a plurality of bytes which are then written to the layer one (L1) hardware interface.

Preferably, the read and write procedures described above all adopt the same prototype so that the levels of the comms stack are interchangeable.

It should also be noted that whilst a seven layer comms stack has been described above in detail, comms stacks having a different number of layers may be provided instead by removing some of the functions mentioned above to discrete layers. Thus, it should be noted the comms stack is not to be limited to the exact configuration herein described.

With reference to FIG. 8A, operation of the above mentioned dynamic reconfigurable interface will now be described. The interface is enabled, disabled and reconfigured by way of the RPC's 86 & 88, the communications manager 90 and the object cache 92 maintained in the client station 64.

For the purposes of the description of the interface, it should be imagined that, as shown in FIG. 8A, the server 56 is connected to a remote client station 64 by a data link 80. A user working at the remote client station wishes to remotely control the server 56 and the object model maintained therein. Control of that object model enables control of the attached telecommunications system to be implemented.

The dynamic interface at the client station 64 advantageously enables a remote processing of operations on the server 56. That is to say that all manipulation of the set of objects forming the object model (and hence changing and controlling of the object model 82) is undertaken at the server end of the interface thereby reducing the load on the client station.

The dynamic interface comprises a remote procedure call interface object (RpcIf) and a connection manager object (CxnMgr). The RpcIf object provides services to construct and destroy objects, services to publish and revoke functions on the local station allowing these published services to be invoked by connected client stations, a service to initiate a listening process for remote services and two services to execute a function on a remote station. The RpcIf object allows the published services to be changed dynamically at run time.

The CxnMgr object provides services to construct and destroy objects, and services to connect and disconnect to/from a remote station.

For a remote function registration and invocation to succeed, both the caller (e.g., client station) and the provider (e.g., server station) must have created RpcIf and CxnMgr objects. The RpcIf object on the remote server 56 will listen for attempted remote connection by the client station 64. The CxnMgr object on the client station has a connect service which it invokes in order to establish a connection to the remote server 56. When the connection is established, a connection object is returned which provides a context (for example, information about the location of the appropriate RpcIf object) of the remote server 56 and the type of connection (Cxn) thereto.

At any time, the remote server 56 can invoke a "AddLocalFn" service to make available a function (F1) on the server 56. Once this has been done, and a connection made to the server station 56, the RPC 88 on the client station 64 can then invoke an "execute remote function" service which specifies the function to be executed remotely (F1), the type of connection (Cxn) and the context. The remote server 56 then locally executes the function F1 and returns the results to the client station 64.

The type of connection to be made (specified by Cxn) may be a network (e.g., ethernet) connection, an RS232 connection or a modem link via a public telephone network.

As described above, the connection manager will always immediately open a connection to a remote server for each and every remote function invoked. When the connection type is a network, this is not inconvenient for the user. However, when the connection is made via a modem, for example, the user can be forced to wait repeatedly while the client station 64 initiates a link with the remote server 56. This can cause an unacceptable delay for the user.

In order to overcome this problem, the connection manager may be provided with a buffer that stores outgoing connection requests until a sufficient number of requests have been made to warrant the opening of a modem connection. Once this target has been reached, the connection manager would connect to the remote server and transmit multiple instructions to the remote server, thereby enabling a number of requests to be broadcast each time the modem link is established. The buffer could be switched in and out in reliance on the information contained in the Cxn object so that ethernet connections, for example, are not subject to the buffering process.

The object structure maintained in the local object cache may be updated while the connection manager is waiting to open a communication link so that, to the user, it appears that there is no delay between issuing instructions to make a change and the receipt of visual confirmation that the change has been implemented.

In the preceding description of the client-server arrangement used for controlling the telecommunications system, it has been assumed that the object cache 92 in the client station 64 contains a complete copy of the object model 82 maintained in server 56. This complete copy of the object model would typically be made at the time that the client station 64 first connects to the server 56. However as the telecommunications sites become more complex, so the object model 82 maintained on the server 56 becomes more complex, and the time taken to make a complete copy of that object model in the cache 92 of the client station 64 becomes progressively longer. Hence, although as described earlier, once the complete copy has been made, updates in the model can be realized very quickly by passing operations (including 'Before' and 'After' states) between the client 64 and the server 56, and vice versa, there is a significant initial performance degradation associated with establishing the copy of the object model 82 in the cache 92 of the client station 64.

Further, it is possible that client station 64 will be used to manage the object models on a number of server stations. Hence, if a complete copy of each object model is to be stored at the client station 64, then a large amount of memory is required at the client station 64.

Figure 16:
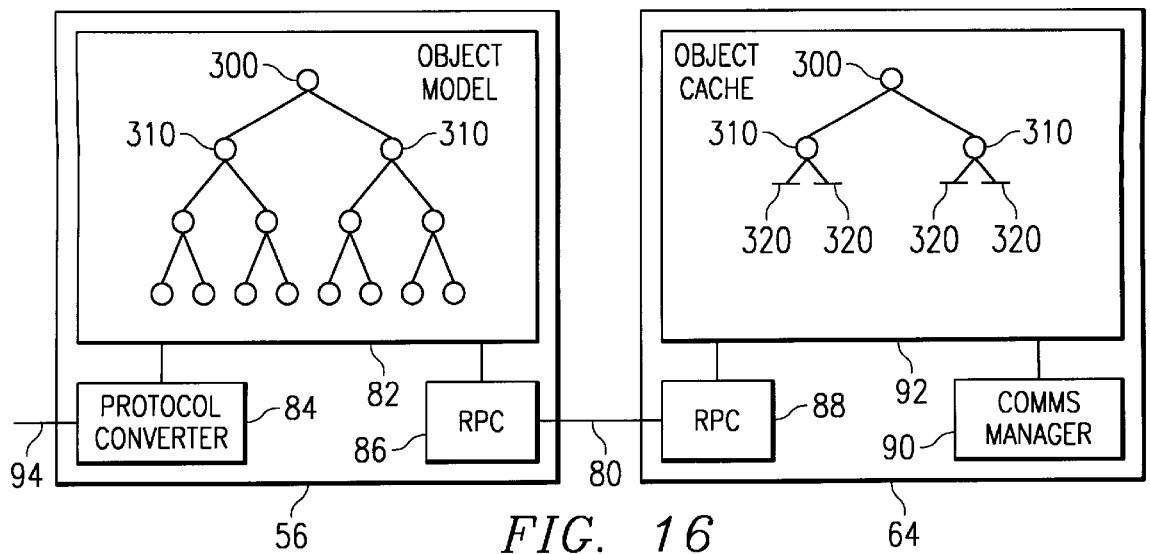
FIG. 16 illustrates the portion of the object model that is stored in the object cache of the client station in accordance with preferred embodiments of the present invention.

According to preferred embodiments of the present invention, these problems are solved by arranging the client station 64 to only load in a certain portion of the object model 82 at the time it initially connects to the server 56. As an example, if the server 56 is used to manage two sites, then the client station 64 may be arranged to only load that portion of the object model including the server object and the two site objects depending from that server object. FIG. 16 is similar to FIG. 8A, but illustrates the contents of the object model 82 and the object cache 92. In FIG. 16, it can be seen that the object cache initially contains only the server object 300 and the two site objects 310 depending therefrom. As illustrated in FIG. 16, two markers 320 are then associated with each of the site objects 310 in the object cache 92 to indicate that there are two additional child objects depending from each site object 310 which have as yet not been loaded into the object cache 92. A marker, by way of its position in the object cache 92, gives the position in the server object model where the corresponding child object can be found.

Figure 17:
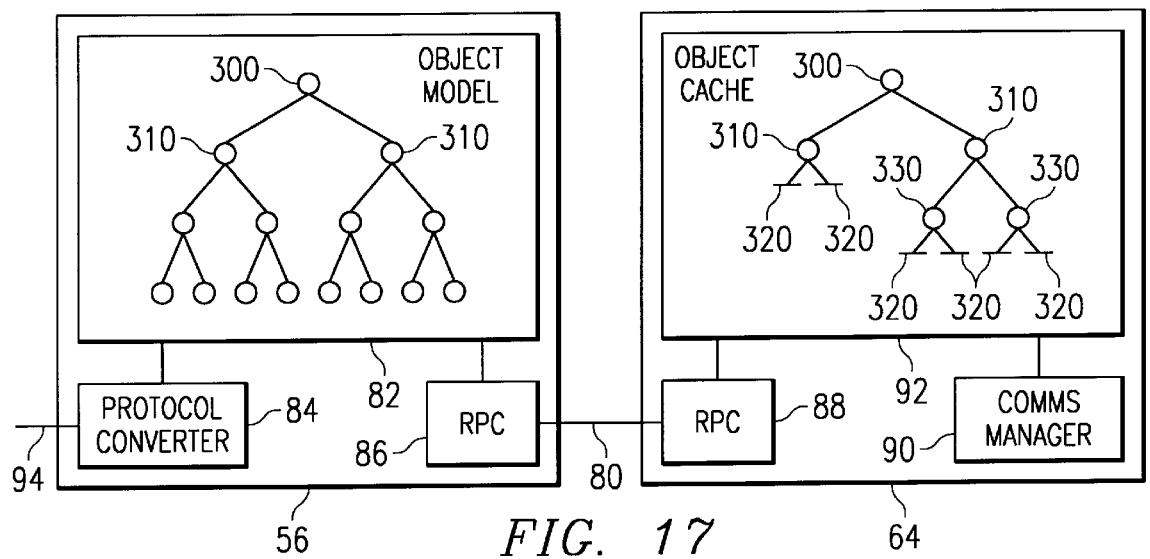
FIG. 17 illustrates an expanded portion of the object model maintained in the object cache of the client station in accordance with preferred embodiments of the present invention.

Via the user interface 64(5), the user at the client machine 64 is provided with a server view showing the two sites 310 managed by that server. If the user then requests via the user interface 64(5) a rack view for one of the sites 310, the client station can load the portion of the object model 82 needed in order to construct that rack view. The preferred mechanism for loading additional objects from the object model will be described in more detail later with reference to FIG. 20. The portion of the object model 82 now stored in the object cache 92 at the client station 64 takes the form illustrated in FIG. 17. As shown in FIG. 17 two rack objects 330 have now been added to the object model depending from one of the site objects 310. The markers have now been moved such that two marker objects 320 are associated with each of the two rack objects 330.

Figure 18:
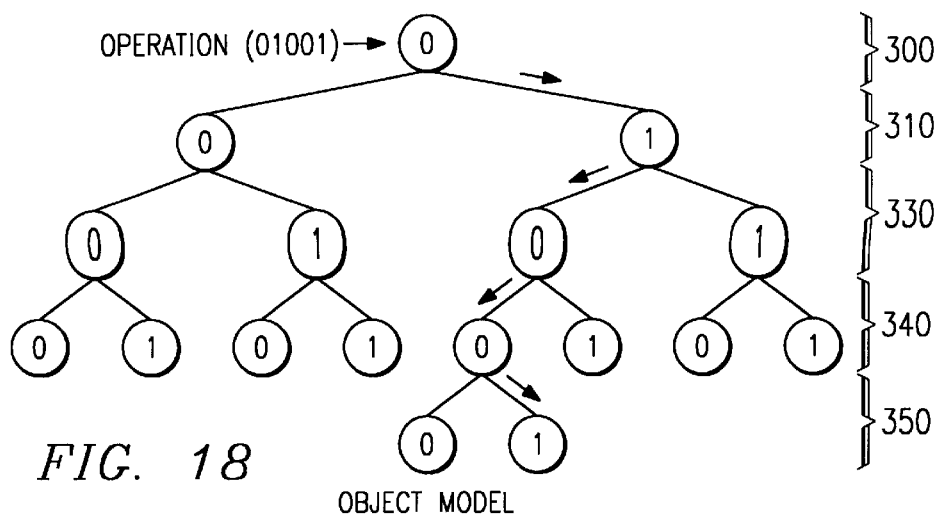
FIG. 18 illustrates how operations are routed to a destination object in the object model in accordance with preferred embodiments of the present invention.

In addition to user requests causing the client station to load in more of the object model 82 into the object cache 92, operations received by the client station 64 from the server 56 may in a similar manner cause the client station to load a further portion of the object model 82 into the object cache 92. As illustrated in FIG. 18, and discussed earlier in connection with the sixth layer 600 of the comms stack 93 shown in FIG. 11, an operation has an address (called a path identifier) associated therewith that identifies a path through the object model to the destination object, the destination object being the object to which the operation should be applied. Hence, in the FIG. 18 example in which the address is shown as 01001, the operation is passed from the top layer of the object model (the server object 300) to the site object 310 identified by the numeral 1. From there the operation is passed to the rack object 330 identified by the numeral 0, and from there to the shelf object 340 identified by the numeral 0. From here, the operation is passed to the card object 350 identified by the numeral 1, this being the destination object to which the operation is to be applied.

With this form of addressing for operations, it will be apparent that if the object cache 92 only stores a portion of the object model 82, then an operation may begin to traverse the tree structure within the object cache 92, but may be unable to reach its final destination object if that destination object has not yet been loaded into the cache 92. For example, in the FIG. 17 illustration, the operation shown in FIG. 18 would only reach the rack object 330. To enable the operation to reach its destination object, the client station 64 can be arranged to load the portion of the object model comprising the shelf object 340 and its dependent card objects 350.

It has been found that this approach of partially loading the object model 82 into the cache 92 and then loading additional portions of the object model as required, provides significant performance benefits over the alternative approach of loading in the entire object model at the time the client station 64 connects to the server 56. This is due to the fact that the user at the client station 64 is generally only interested in a particular portion of the object model. Hence, those portions of the object model 82 which the user does not request to view, or to which no operations are directed via the equipment of the telecommunications system, need never be loaded into the object cache 92 of the client station 64. This provides both a performance benefit, and also a memory saving, since the client station 64 need no longer be provided with the large memory that it would otherwise require in order to load the entire object model.

In a typical implementation of a system in accordance with the preferred embodiment, the equipment at a site being managed by the server 56 may regularly generate messages, such as alarm messages, to be passed to the server 56. At the server 56, these messages are converted by the comms stack of the protocol converter 84 (as illustrated in FIG. 11) in to operations to be applied to the object model 82. Hence, if an alarm message was generated by a piece of equipment at the central station, a corresponding operation would be created by the protocol converter to apply to the appropriate destination object in the object model 82. This destination object may be the object corresponding to the equipment issuing the alarm message, or may in fact be an alarm object created as a child object of the object corresponding to the piece of equipment issuing the alarm. Using the addressing technique as illustrated earlier with reference to FIG. 18, this alarm operation would work its way down the object model tree until it reached the destination object, whereupon the operation would be applied to that destination object. If this operation caused the alarm object to change from a clear "state" to a persistent "state", this change in state would then be propagated back up the object model tree to all parent objects from which that alarm object depends. Hence, if the alarm corresponds to an element on a card, then the parent objects, e.g. the card object, the shelf object, and the corresponding rack object, would all be updated to reflect this change in the alarm state.

When the alarm operation is created by the protocol converter 84 for application to the object model 82, that alarm operation is also sent via the RPC interface 86, 88 to the client station 64, for application to the object model within the object cache 92. If the object cache 92 only includes a portion of the object model 82, then it is apparent that this alarm operation will not be able to traverse the object model in the cache 92 to reach its destination object, i.e. the appropriate alarm object. Hence, the client station 64 might decide to load from the server 56 a portion of the object model 82 required to enable the alarm operation to reach its destination object. However, in accordance with preferred embodiments of the present invention, the client station 64 may decide in certain instances that it is not appropriate to load the respective portion of the object model into the object cache 92.

Instead, the processor 64(2) used to process the operation in the client station may be arranged to determine, based on the operation, what updates are needed to the status fields associated with each object in the object cache 92, to make the necessary changes to the status fields, and to then discard the operation.

For example, if a site object is currently viewable at the client 64 and has a status indicating that no alarms are persistent, then when an alarm operation is routed to that site object indicating that one of the cards in one of the shelves on one of the racks of that site object has a persistent alarm, there may be no requirement at that point to load in the associated portion of the object model. The view of the site object can merely be altered to show a status indicating that there is a persistent alarm within that site, and the operation can then be discarded by the client. By this approach, the portion of the object model loaded at the client 64 can be kept to the minimum required by the client.

In preferred embodiments, a cached record is kept for each object within the object cache 92, in which information is stored about the number of alarms that are currently persistent in that object and all its children objects. Hence, for the site object currently being viewed, the status information will be changed to persistent as soon as the first persistent alarm operation is processed relating to an object within that site, and will remain in the persistent state as each subsequent persistent alarm operation is processed. If, subsequently, another alarm operation is routed to the same site object indicating that an alarm has been cleared, corresponding information is placed within the cached record. In this way, the site object can keep track of the alarms raised and cleared, such that it can determine when it is able to return its status to a state that indicates that no alarms are currently persistent.

As an alternative to the above, if no cached record is provided for the site object, then upon receipt of a subsequent alarm operation indicating that an alarm has been cleared, the client station 64 can be arranged to load in to the object cache 92 that portion of the object model 82 containing all of the child objects depending from that site object. This is required in order for the site object to determine whether its own status can be returned to "clear", since there may well be more than one alarm persistent at any one time within the various child objects depending from the site object, and hence an alarm operation indicating a "clear" does not necessarily mean that the site object can be returned to a clear status.

Figure 19:
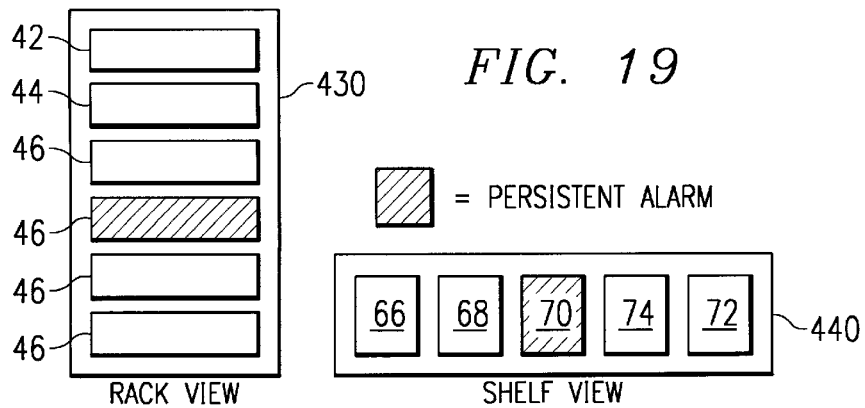
FIG. 19 provides an illustration of two typical views that may be provided on the display screen of the client station.

FIG. 19 provides an illustration of two typical views that may be provided on the display screen of the client station. A rack view 430 may be displayed to the user to indicate the shelves present in that rack. Assuming the rack is similar to the common equipment rack illustrated in FIG. 3, the rack view 430 will show the RF Combiner and Power Amp shelf 42, the Power Supply shelf 44, and the four modem shelves 46 contained within the equipment rack. Assuming no error messages have been received by the server station from the telecommunications equipment, then all the shelves within the rack will preferably be displayed in a suitable colour, such as green, to indicate that no alarms have been raised. In FIG. 19, shelves which currently have no errors associated therewith are displayed in white. When an error message is received by the server station from, for example a particular card on a modem shelf, the object model 82 on the server 56 will be updated accordingly. Additionally, the same operation will be applied to the portion of the object model stored in the object cache 92 of the client station 64. As part of this process, irrespective of whether the relevant card object is stored in the object cache 92, the status of the parent shelf object will be updated to show that a persistent alarm has been raised. The rack view will then be updated such that the relevant parent shelf object is displayed in a suitable way, for example by displaying it in red, to indicate the presence of the persistent alarm. In FIG. 19, one of the modem shelves 46 is displayed with 'hatching' to show the presence of a persistent alarm.

If the user wishes to obtain more information about the alarm relating to the modem shelf 46, he/she may request the client to display the shelf view for that modem. This shelf view 440 shown in FIG. 19 illustrates the various cards contained on the modem shelf. Assuming the arrangement is similar to that illustrated in FIG. 3A, the shelf view will show a RF unit 66, an analogue card 68, a number of modem cards 70 (only one is illustrated in FIG. 19 for the sake of clarity), a tributary unit card 74 and a shelf controller 72. If the error in the modem shelf actually arose from an error on a particular modem card, this modem card 70 would be illustrated accordingly (displayed by hatched lines in FIG. 19). It is possible that more than one card may have an error, in which case more than one card would be shown as having an error.

Figure 20:
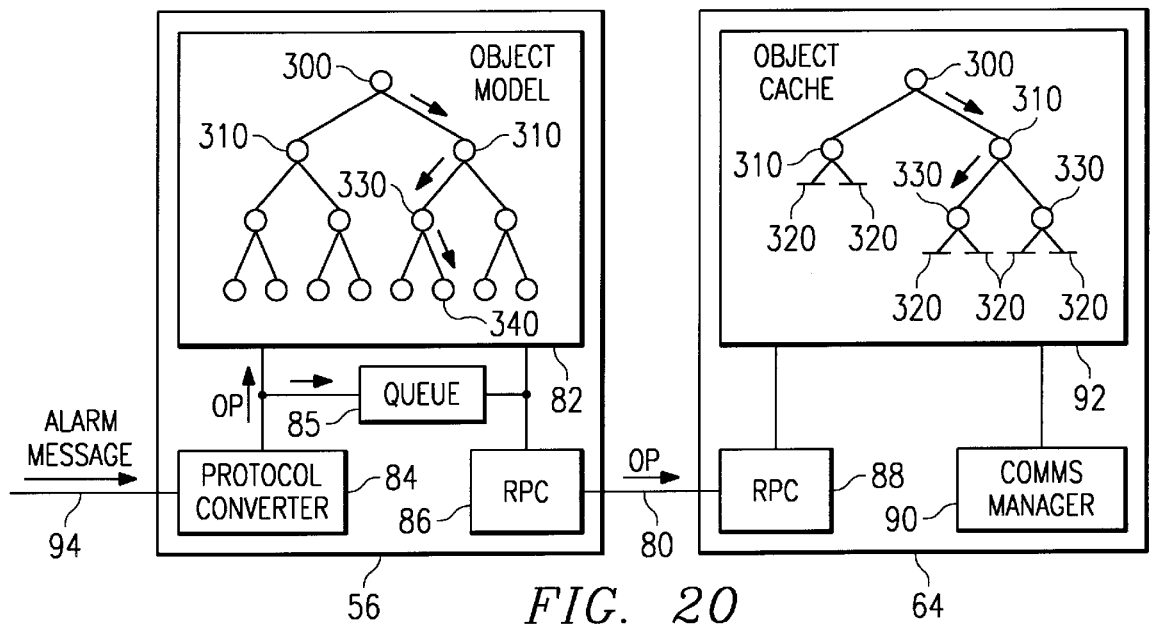
FIG. 20 illustrates the use of a queue on the server station to hold operations to be sent to the client station in accordance with preferred embodiments of the present invention.

The mechanism by which messages generated by equipment within the telecommunications system are processed by both the server station and the client station will now be discussed in more detail with reference to FIG. 20. As mentioned previously, when a message such as an alarm message is received by the server station 56 via data link 94, it is passed to the protocol converter 84 where the message is converted into an operation. This operation is then applied to the object model in order to cause appropriate changes to be made to the destination object within the object model. Additionally, the operation is placed in a queue 85, the queue being used to hold all operations to be passed from the server 56 to the client 64. Preferably, the queue operates in a first-in, first-out (FIFO) manner such that the operations can be passed sequentially to the client station 64.

Each operation is passed sequentially via the RPC mechanisms 86, 88 to the client station 64, whereupon the operation is applied to the portion of the object model maintained in the object cache 92. If, during the processing of an operation by the client, it is determined that the destination object to which the operation is directed is not currently in the portion of the object model maintained in the object cache 92, then the client station 64 may be arranged to retrieve the additional objects required from the server station 56. For instance, considering the FIG. 20 example, the destination object may be a shelf object 340, and the client station may only include in its object cache 92 the parent rack object 330. In preferred embodiments, a 'RouteOp' service is employed to route an operation to its destination object within the object model. In performing this service within the object cache 92, the two markers 320 associated with the relevant rack object 330 will be reached. Preferably, the RouteOp service is arranged to act upon the reaching of the markers 320 by employing the communications manager 90 to establish a separate RPC interface with the server 56. Once this interface has been established, a retrieve operation can be remotely invoked on the server 56 in order to retrieve the child objects located at the positions in the object model indicated by the two markers. Upon processing this retrieve operation at the server 56, the server will return via the RPC interface the child objects depending from the rack object 330, and the portion of the object model maintained in the object cache 92 will be updated accordingly. The RouteOp service can then continue to route the operation to its destination object, whereupon the operation can be applied to the destination object. Whilst additional objects of the object model are being retrieved via the RPC interface, no subsequent operations are passed from the queue 85 to the client station 64. It is important that these subsequent operations are not processed by the client whilst the object model in the object cache 92 is being updated, since these operations may have some relevance to the additional object(s) being loaded. Since the queue in effect becomes blocked whilst the object cache 92 is being updated, the additional objects to be loaded into the object cache 92 are passed from the server to the client via the separate RPC interface, rather than being placed on the queue 85.

Given that one of the aims of maintaining only a portion of the object model 82 within the object cache 92 of the client station 64 is to minimize the memory requirements of the client station, it is preferable for some memory management facility to be provided on the client station 64. In preferred embodiments, a record is maintained on the client station 64, for each object maintained in the portion of the object model stored in the object cache 92, identifying a time at which the last operation was applied to that object by the client station. If, after a predetermined time, no further operations have been applied to a particular object maintained within the object cache 92, then a memory reclaim process can be invoked to delete that object from the object cache 92, thereby freeing up a portion of the object cache 92 for the storage of other objects of the object model. When an object is deleted, it is replaced in the object cache 92 by a marker, so that it can subsequently be retrieved again from the object model 82 if required. The predetermined time (or expiry time) can be a preselected value applicable to all objects stored in the object cache 92, or alternatively can be specified on an object-by-object basis.

Figure 21:
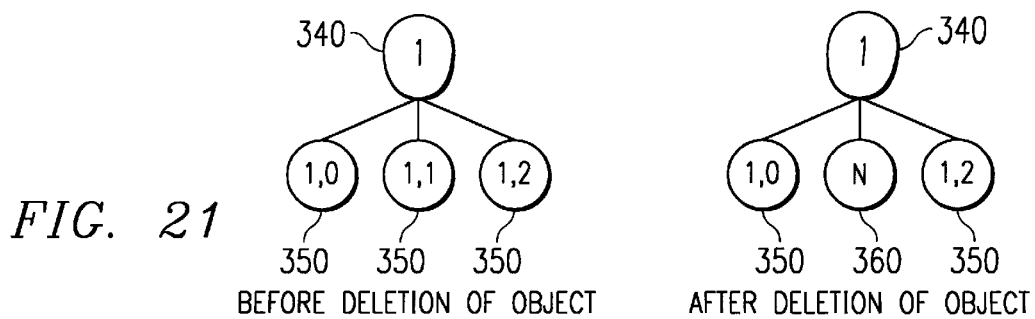
FIG. 21 illustrates the use of a 'Null' object to replace objects deleted from the object model.

If, as a result of either a message from the equipment of the telecommunications system or a command issued by a user at the client station 64, it becomes necessary to remove an object from the object model 82, then in preferred embodiments the object removed is replaced by a null object which depends from the parent object of the object removed. This is illustrated schematically in FIG. 21. In FIG. 21, a shelf object 340 is shown as having three card objects 350 depending therefrom. If, for the sake of illustration, the shelf object 340 is represented within a path identifier by the numeral 1, then the three card objects will be represented within a path identifier by the numerals 1,0, 1,1, and 1,2, respectively. If the card object 350 identified by the path identifier 1,1 is to be deleted, then a null object 360 is introduced to replace the object deleted. By doing this, there will be no requirement to change the path identifier of the third card 350, which can now remain as 1,2. This is beneficial since, at some future time, the client station 64 may request the server station to retrieve the object identified by the path identifier 1,2. Since no changes to the path identifier have been made as a result of deleting an object in the object model, then the server 56 will be able to retrieve the correct object required by the client station 64.

Although particular embodiments has been described herein, it will be appreciated that the present invention is not limited thereto and that many modifications and additions may be made within the scope of the invention and the attached claims. For example, whilst the preferred embodiments of the invention have been described above in relation to different aspects of a control system, it will be appreciated that this control system interfaces with various pieces of hardware and could be provided in a series of ASICs (Application Specific Integrated Circuits), if desired. In addition, it should be noted that whilst the foregoing description has been directed towards remote control of a server from a client station, it would be possible to remotely control a client station from a server or to remotely control a remote client station from a local client station. Thus, any of the devices described above may be provided on any station.

What is claimed is:

1. A client station for controlling a telecommunications system, the telecommunications system including a central station and a server station, the server station being arranged to maintain an object model thereon representing the central station, and being connectable to the central station to send control signals to the central station in accordance with the object model, the client station comprising:

a communications manager for establishing first and second interfaces with the server station to enable communication between the client station and the server station, thereby to manage the object model maintained on the server station;

a memory for storing a portion of the object model including at least one object of the object model to allow an operation to be performed on the at least one object of the object model;

a processor for processing commands received by the client station via the first interface from a queue maintained on the server station, the commands requiring an operation to be performed on the at least one object by the processor in order to reconfigure the at least one object for storage in the memory;

a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor.

2. A client station as claimed in claim 1, wherein the commands received from the queue on the server station relate to updates made to objects of the object model maintained on the server station.

3. A client station as claimed in claim 1, wherein commands to be executed on the portion of the object model in said memory comprise operations including a path identifier identifying a destination object to which the operation should be applied.

4. A client station as claimed in claim 1, wherein each object in the portion of the object model has status information associated therewith, and the processor, on processing a command, is arranged to determine whether any of said status information needs updating, and to update that status information.

5. A client station as claimed in claim 4, further comprising:

a display controller for displaying on a display device connectable to the client station a view of the objects stored in said memory, a visual representation of said status information being displayable with each object view;

the processor, on updating said status information, being arranged to cause any displayed visual representation of status information to be updated.

6. A client station as claimed in claim 1, wherein the telecommunications system comprises a plurality of server stations and central stations, each server station being connectable to at least one central station and maintaining an object model representing said at least one central station, the client station being connectable to a number of said plurality of server stations.

7. A client station as claimed in claim 1, wherein the first and second interfaces are established via a dynamic interface comprising means for generating a remote procedure call interface object to reconfigure the dynamic interface to enable operations on the server station to be invoked from the client station.

8. A client station as claimed in claim 1, wherein if an object in the portion of the object model has a child object associated therewith, but the child object is not stored in the portion of the object model, a marker is associated with the object to indicate the existence of said child object.

9. A client station as claimed in claim 1, wherein if an object is deleted from the object model, a null identifier is added to the object model to indicate that the object has been deleted.

10. A client station as claimed in claim 1, further comprising:

a recording means for maintaining a record, for each object in the portion of the object model stored in the memory, identifying a time at which the most recent command was applied to that object by the client station; and a memory reclaim means for periodically referencing the record and for deleting an object from the memory of the client station after a predetermined time has passed since the most recent command was applied to that object, any object deleted from the memory being replaced by a marker.

11. A client station as claimed in claim 6, wherein the telecommunications system is a wireless telecommunications system, in which the central station is arranged to relay messages from server stations to a public telephone network, the connection between the server stations and the central station being wireless connections.

12. A communications manager for a client station arranged to control a telecommunications system, the telecommunications system including a central station and a server station, the server station being arranged to maintain an object model thereon representing the central station, and being connectable to the central station to send control signals to the central station in accordance with the object model, the client station storing a portion of the object model in memory including at least one object of the object model to allow the client station to perform an operation on the at least one object of the object model, the communications manager comprising:

means for establishing first and second interfaces with the server station to enable communication between the client station and the server station via an interface, thereby to manage the object model maintained on the server;

a command manager for receiving commands via the first interface from a queue maintained on the server station, the client station having a processor arranged to process the commands received via the first interface, the commands requiring an operation to be performed on the at least one object by the command manager in order to reconfigure the at least one object for storage in the memory;

a retrieval means, responsive to a command requiring an operation to be performed on an object not currently in the portion of the object model stored in the memory, for retrieving from the server station via the second interface said object for inclusion in the portion of the object model stored in the memory, during which time no further commands are processed by the processor.

13. A method of controlling a telecommunications system from a client station, the telecommunications system including a central station and a server station, the server station being arranged to maintain an object model thereon representing the central station, and being connectable to the central station to send control signals to the central station in accordance with the object model, the method comprising the steps of:

employing a communications manager in the client station to establish first and second interfaces with the server station to enable communication between the client station and the server station, thereby to manage the object model maintained on the server;

storing in a memory of the client station a portion of the object model including at least one object of the object model to allow an operation to be performed on the at least one object;

processing commands received by the client station via the first interface from a queue maintained on the server station, the commands requiring an operation to be performed on the at least one object in order to reconfigure the at least one object for storage in the memory;

responsive to a command requiring an operation to be performed on an object not currently in the portion of the object model stored in the memory, retrieving from the server station via the second interface said object for inclusion in the portion of the object model stored in the memory, during which time no further commands are processed by the processor.

14. A method as claimed in claim 13, wherein each object in the portion of the object model has status information associated therewith, and the method further comprises the step of determining whether any of said status information needs updating, and updating that status information.

15. A method as claimed in claim 14, further comprising the step of displaying on a display device connectable to the client station a view of the objects stored in said memory, each object view including a visual representation of said status information.

16. A method as claimed in claim 13, wherein if an object in the portion of the object model has a child object associated therewith, but the child object is not stored in the portion of the object model, the method further comprises the step of associating a marker with the object to indicate the existence of said child object.

17. A method as claimed in claim 13, wherein if an object is deleted from the object model, the method further comprises adding a null identifier to the object model to indicate that the object has been deleted.

18. A method as claimed in claim 13, further comprising the steps of:

maintaining a record, for each object in the portion of the object model stored in the memory, identifying a time at which the most recent command was applied to that object by the client station; and periodically referencing the record and for deleting an object from the memory of the client station after a predetermined time has passed since the most recent command was applied to that object, any object deleted from the memory being replaced by a marker.

* * * * *